United States Patent
Baptist et al.

(10) Patent No.: US 9,026,758 B2
(45) Date of Patent: May 5, 2015

(54) MEMORY DEVICE UTILIZATION IN A DISPERSED STORAGE NETWORK

(75) Inventors: Andrew Baptist, Chicago, IL (US); Manish Motwani, Chicago, IL (US); Wesley Leggette, Oak Park, IL (US); Steven Mark Hoffman, Chicago, IL (US); Dustin M. Hendrickson, Biggsville, IL (US); Ryan Joseph Kuester, Island Lake, IL (US); S. Christopher Gladwin, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 563 days.

(21) Appl. No.: 13/097,305

(22) Filed: Apr. 29, 2011

(65) Prior Publication Data

US 2011/0289283 A1 Nov. 24, 2011

Related U.S. Application Data

(63) Continuation-in-part of application No. 12/218,594, filed on Jul. 16, 2008, now Pat. No. 7,692,641, which is a continuation-in-part of application No. 11/973,613, filed on Oct. 9, 2007, now Pat. No.

(Continued)

(51) Int. Cl.
*G06F 12/00* (2006.01)
*G06F 11/10* (2006.01)
*H04L 9/08* (2006.01)
(Continued)

(52) U.S. Cl.
CPC .............. *G06F 11/10* (2013.01); *H04L 67/1097* (2013.01); *G06F 3/067* (2013.01); *G06F 3/065* (2013.01); *G06F 3/0619* (2013.01); *H04L 9/085* (2013.01); *H04L 9/0863* (2013.01); *H04L 9/0869* (2013.01); *H04L 9/0894* (2013.01); *H04L 2209/04* (2013.01); *H04L 2209/34* (2013.01)

(58) Field of Classification Search
CPC ............................. G06F 3/067; G06F 11/1092
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Aimee Li
*Assistant Examiner* — Michael C Kolb
(74) *Attorney, Agent, or Firm* — Garlick & Markison; Timothy W. Markison

(57) ABSTRACT

A method begins by a processing module determining whether a memory device of a dispersed storage (DS) unit is unavailable to produce an unavailable memory device. The method continues with the processing module determining a methodology regarding DS encoded data stored in the unavailable memory device based on one or more dispersed storage network (DSN) conditions to produce a determined methodology when the memory device is unavailable. The method continues with the processing module initiating, in accordance with the determined methodology, a rebuilding function to rebuild the DS encoded data to produce rebuilt DS encoded data when the determined methodology includes a rebuilding component. The method continues with the processing module storing the rebuilt DS encoded data within available memory of the DS unit.

18 Claims, 19 Drawing Sheets

Related U.S. Application Data 8,285,878, and a continuation-in-part of application No. 11/973,622, filed on Oct. 9, 2007, now Pat. No. 8,171,101, and a continuation-in-part of application No. 11/973,542, filed on Oct. 9, 2007, and a continuation-in-part of application No. 11/973,621, filed on Oct. 9, 2007, now Pat. No. 7,904,475, and a continuation-in-part of application No. 11/241,555, filed on Sep. 30, 2005, now Pat. No. 7,953,937, and a continuation-in-part of application No. 11/403,684, filed on Apr. 13, 2006, now Pat. No. 7,574,570, and a continuation-in-part of application No. 11/404,071, filed on Apr. 13, 2006, now Pat. No. 7,574,579, and a continuation-in-part of application No. 11/403,391, filed on Apr. 13, 2006, now Pat. No. 7,546,427, and a continuation-in-part of application No. 12/080,042, filed on Mar. 31, 2008, now Pat. No. 8,880,799, and a continuation-in-part of application No. 12/218,200, filed on Jul. 14, 2008, now Pat. No. 8,209,363.

(60) Provisional application No. 61/346,173, filed on May 19, 2010.

(51) Int. Cl.
*H04L 29/08* (2006.01)
*G06F 3/06* (2006.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0117217 A1* | 6/2006 | Chien et al. | 714/6 |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0266198 A1* | 11/2007 | Bousis | 711/4 |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2009/0307426 A1* | 12/2009 | Galloway et al. | 711/114 |
| 2010/0023524 A1 | 1/2010 | Gladwin et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IEFT Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner computing system 10

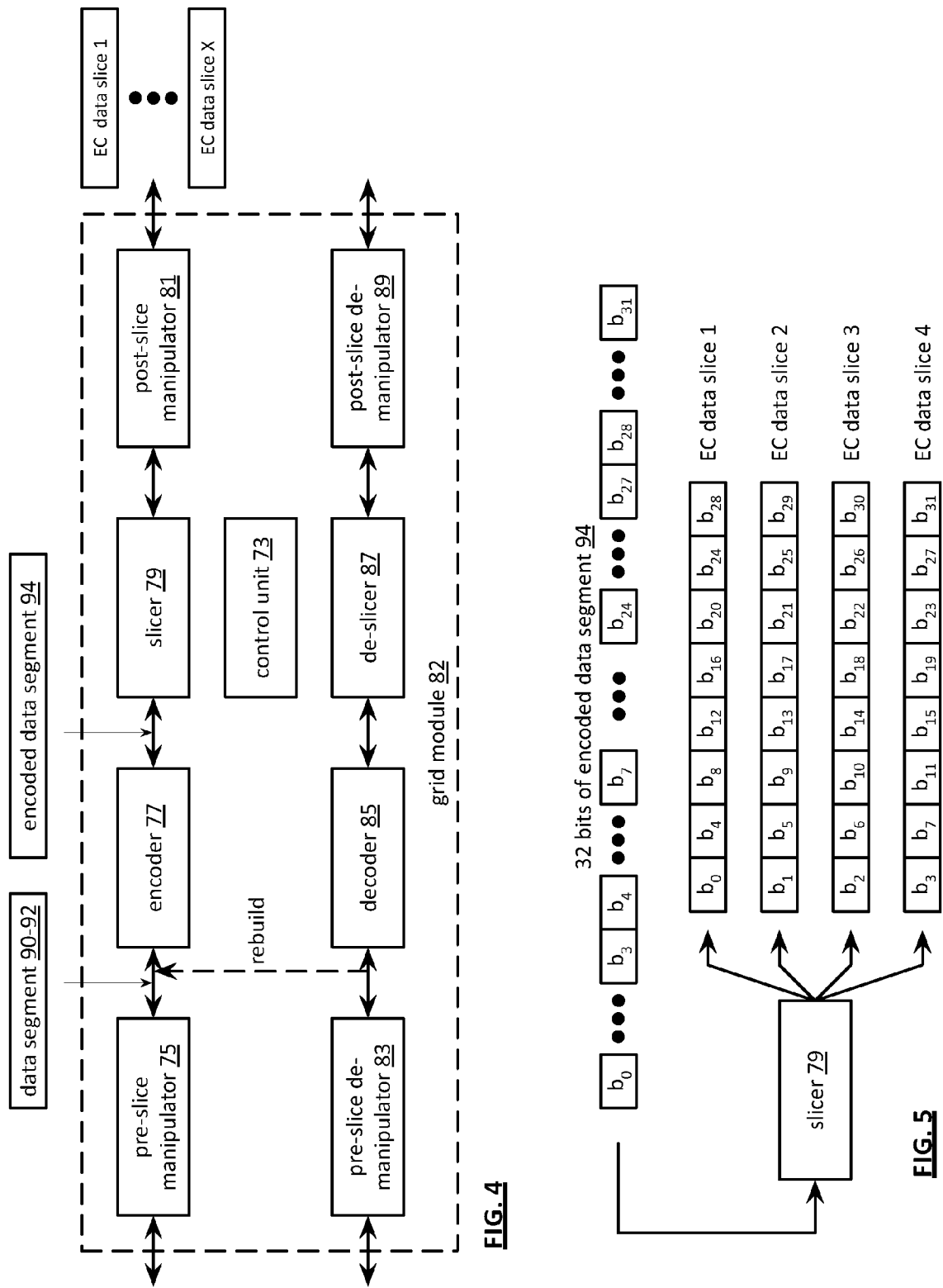

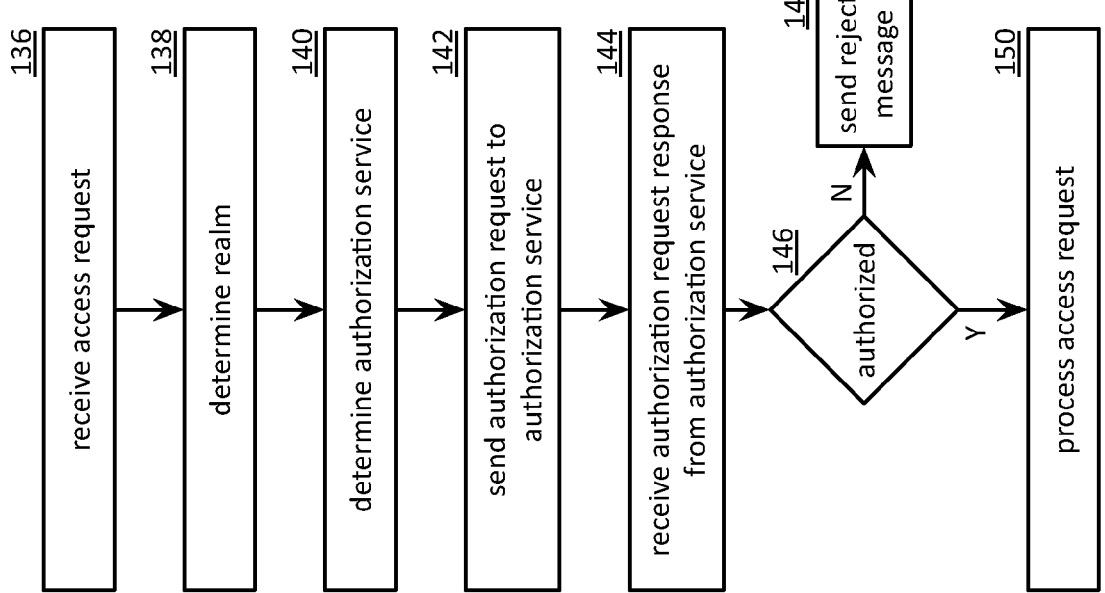

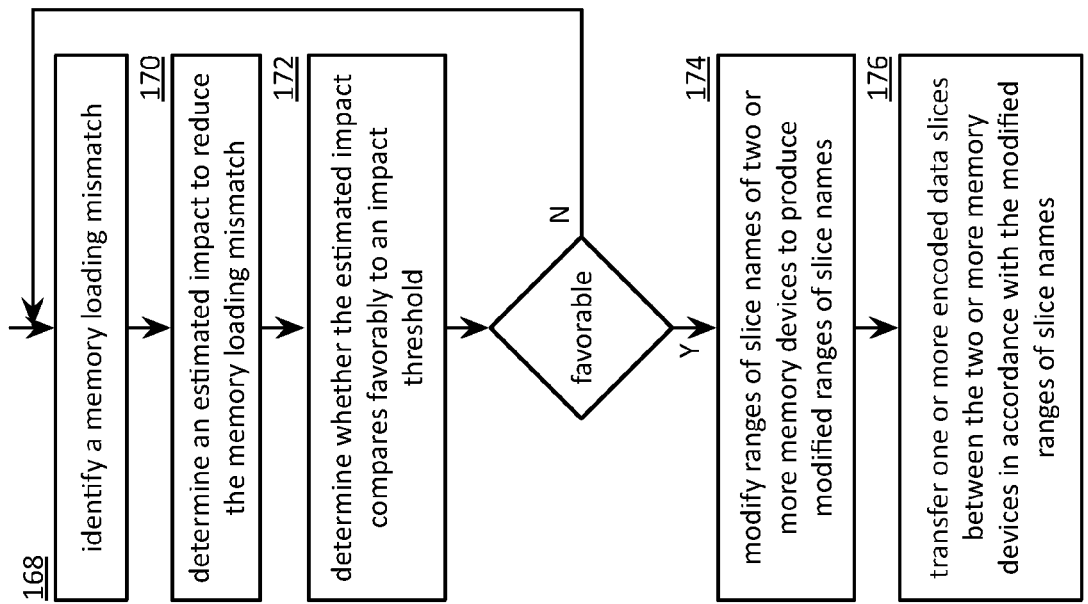

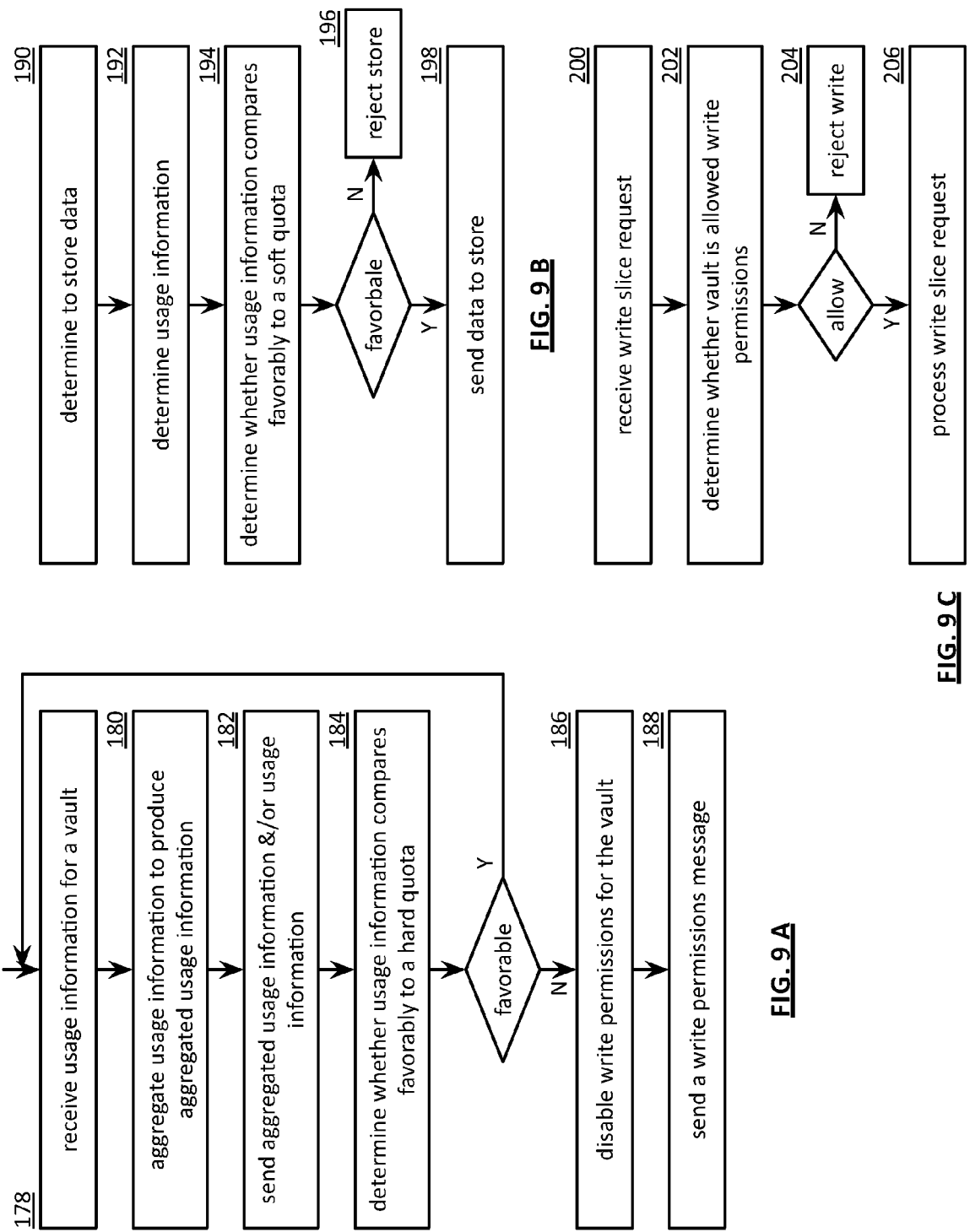

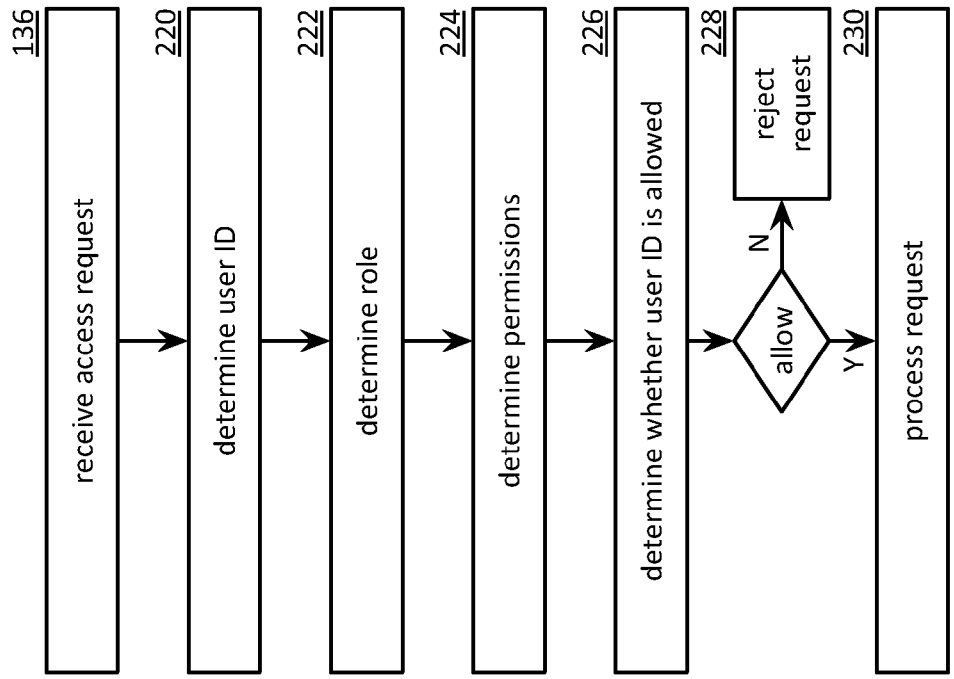

MEMORY DEVICE UTILIZATION IN A DISPERSED STORAGE NETWORK

CROSS REFERENCE TO RELATED APPLICATIONS

The present U.S. Utility Patent Application claims priority pursuant to 35 U.S.C. §119(e) to U.S. Provisional Application No. 61/346,173, entitled "DISPERSED STORAGE NETWORK MEMORY DEVICE UTILIZATION", filed May 19, 2010, which is hereby incorporated herein by reference in its entirety and made part of the present U.S. Utility Patent Application for all purposes.

The present U.S. Utility Patent Application also claims priority pursuant to 35 U.S.C. §120 as a continuation-in-part of U.S. Utility Application No. 12/218,594, entitled STREAMING MEDIA SOFTWARE INTERFACE TO A DISPERSED DATA STORAGE NETWORK, filed Jul. 16, 2008, issued as U.S. Pat. No. 7,962,641 on Jun. 14, 2011, which claims priority pursuant to 35 U.S.C. §120 as a continuation-in-part of:

1. U.S. Utility Application No. 11/973,613, entitled BLOCK BASED ACCESS TO A DISPERSED DATA STORAGE NETWORK, filed Oct. 9, 2007, issued as U.S. Pat. No. 8,285,878 on Oct. 9, 2012;
2. U.S. Utility Application No. 11/973,622, entitled SMART ACCESS TO A DISPERSED DATA STORAGE NETWORK, filed Oct. 9, 2007, issued as U.S. Pat. No. 8,171,101 on May 1, 2012;
3. U.S. Utility Application No. 11/973,542, entitled ENSURING DATA INTEGRITY ON A DISPERSED STORAGE GRID, filed Oct. 9, 2007, ;
4. U.S. Utility Application No. 11/973,621, entitled VIRTUALIZED DATA STORAGE VAULTS ON A DISPERSED DATA STORAGE NETWORK, filed Oct. 9, 2007, issued as U.S. Pat. No. 7,904,475 on Mar. 8, 2011;
5. U.S. Utility Application No. 11/241,555, entitled SYSTEM, METHODS, AND APPARATUS FOR SUBDIVIDING DATA FOR STORAGE IN A DISPERSED DATA STORAGE GRID, filed Sep. 30, 2005, which issued as U.S. Pat. No. 7,953,937 on May 31, 2011;
6. U.S. Utility Application No. 11/403,684, entitled BILLING SYSTEM FOR INFORMATION DISPERSAL SYSTEM, filed Apr. 13, 2006, issued as U.S. Pat. No. 7,574,570 on Aug. 11, 2009;
7. U.S. Utility Application No. 11/404,071, entitled METADATA MANAGEMENT SYSTEM FOR AN INFORMATION DISPERSED STORAGE SYSTEM, filed Apr. 13, 2006, issued as U.S. Pat. No. 7,574,579 on Aug. 11, 2009;
8. U.S. Utility Application No. 11/403,391, entitled SYSTEM FOR REBUILDING DISPERSED DATA, filed Apr. 13, 2006, issued as U.S. Pat. No. 7,546,427 on Jun. 9, 2009;
9. U.S. Utility Application No. 12/080,042, entitled REBUILDING DATA ON A DISPERSED STORAGE NETWORK, filed Mar. 31, 2008, issued as U.S. Pat. No. 8,880,799 on Nov. 4, 2014; and
10. U.S. Utility Application No. 12/218,200, entitled FILE SYSTEM ADAPTED FOR USE WITH A DISPERSED DATA STORAGE NETWORK, filed Jul. 14, 2008, issued as U.S. Pat. No. 8,209,363 on Jun. 26, 2012.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 7A is a flowchart illustrating an example of authorizing an access request in accordance with the invention;

FIG. 7B is a diagram illustrating an example of an authorization table in accordance with the invention;

FIG. 8B is a flowchart illustrating an example of balancing memory utilization in accordance with the invention;

FIG. 9A is a flowchart illustrating an example of managing memory usage in accordance with the invention;

FIG. 9B is a flowchart illustrating another example of managing memory usage in accordance with the invention;

FIG. 9C is a flowchart illustrating another example of managing memory usage in accordance with invention;

FIG. 10A is a diagram illustrating an example of a user role table in accordance with invention;

FIG. 10B is a diagram illustrating an example of a role permissions table in accordance with the invention;

FIG. 10C is a flowchart illustrating another example of authorizing an access request in accordance with the invention;

DETAILED DESCRIPTION OF THE INVENTION

Figure 1:
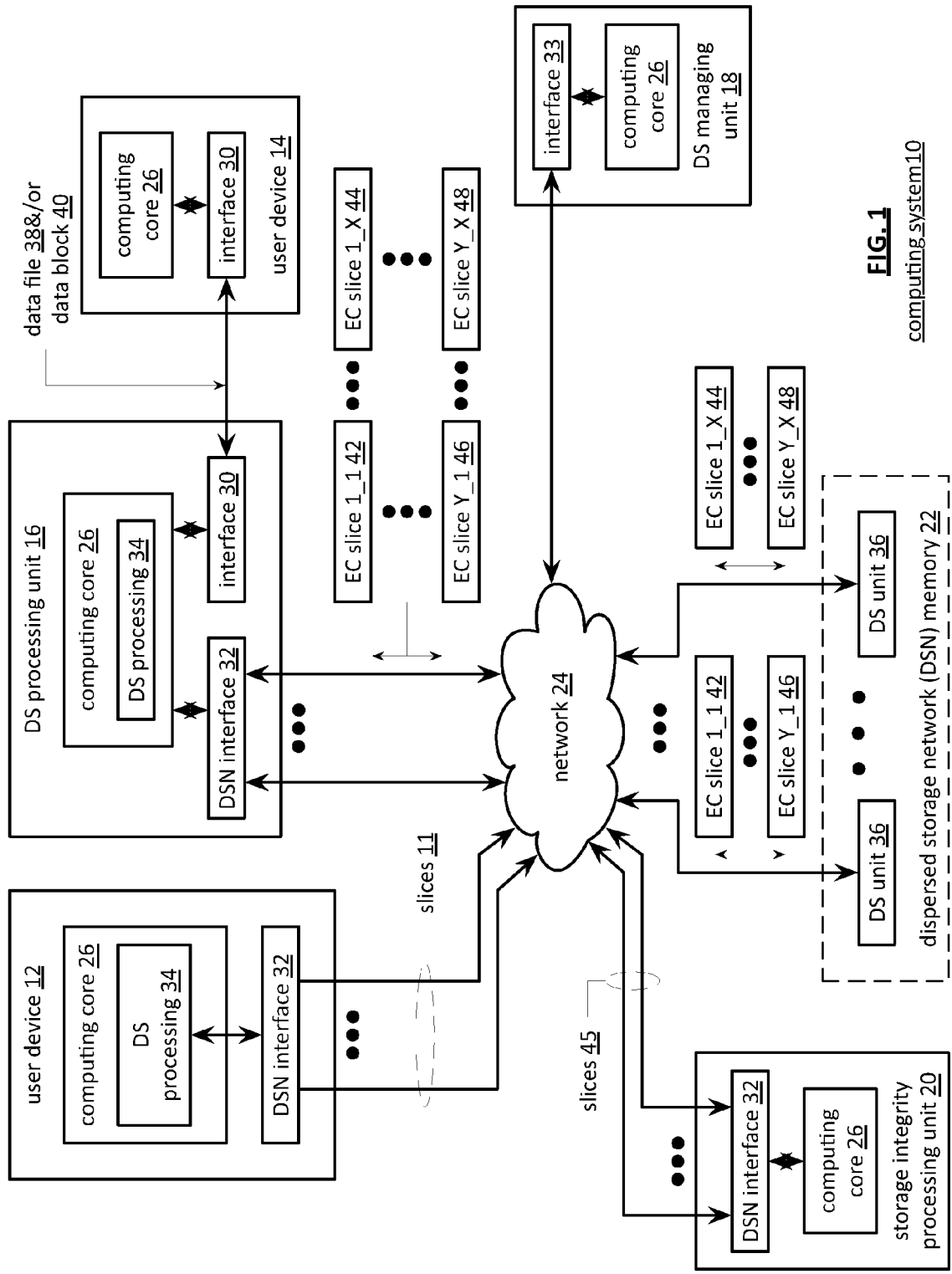
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-19.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-19.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
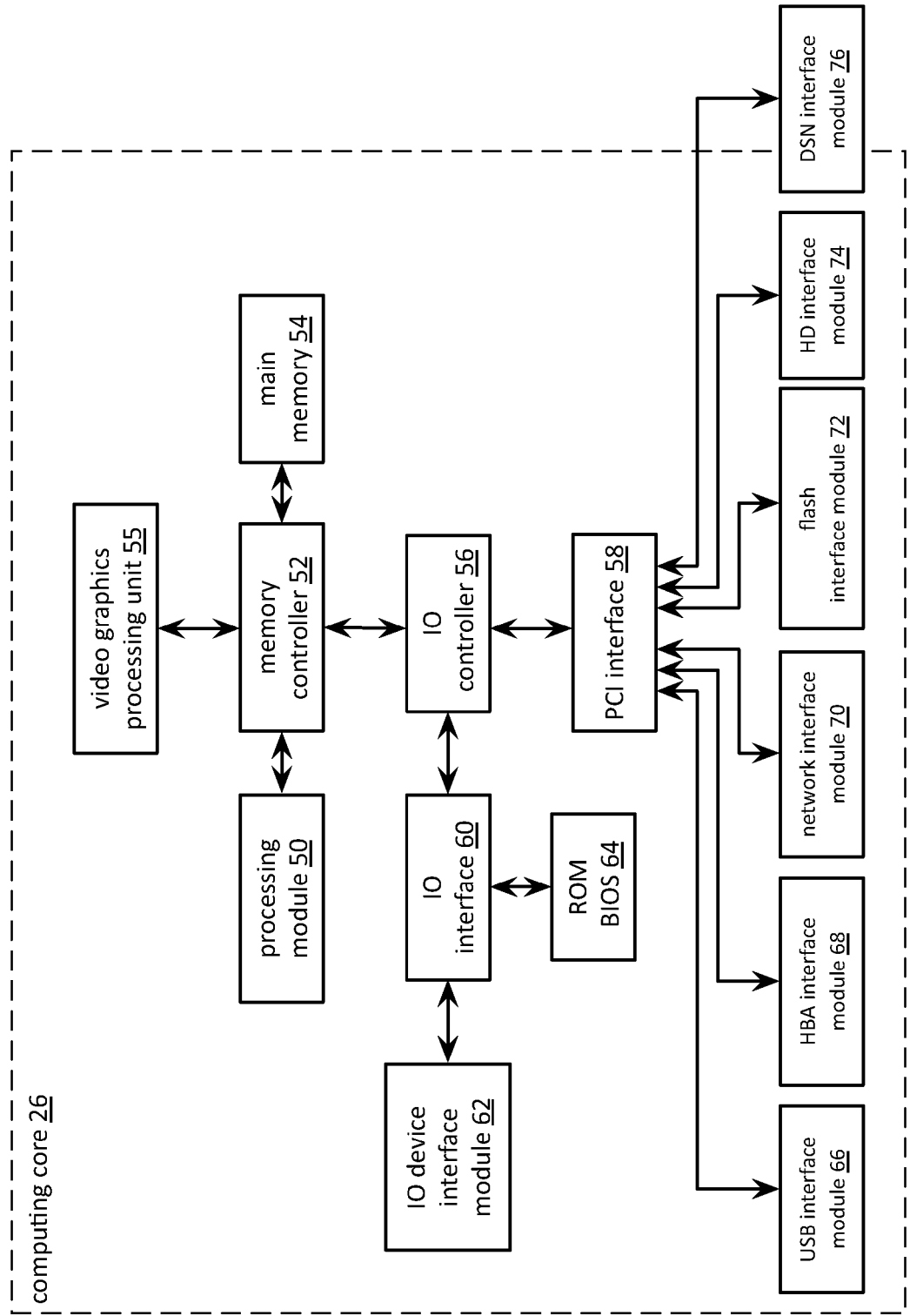
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/ or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-19.

Figure 3:
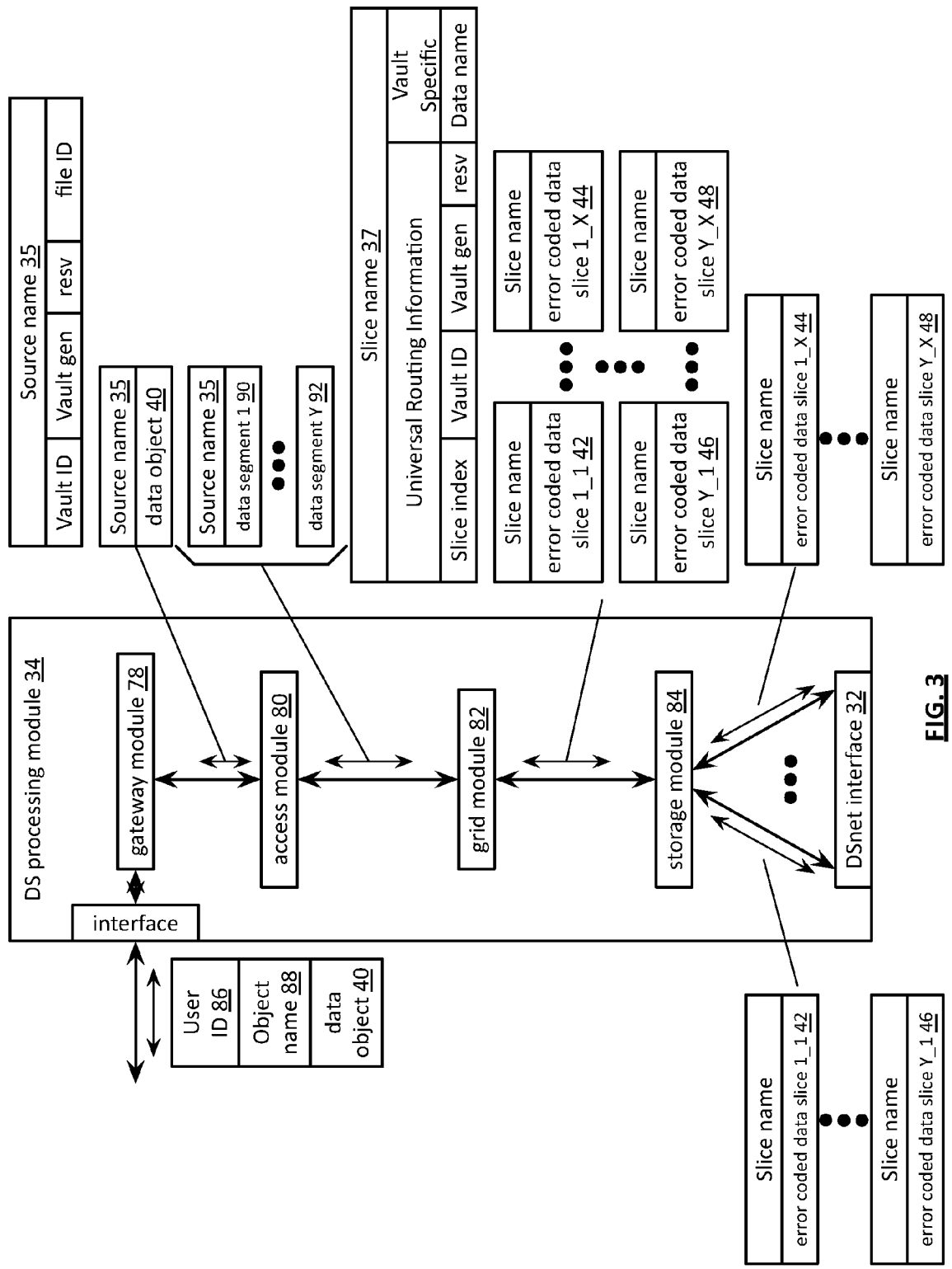
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
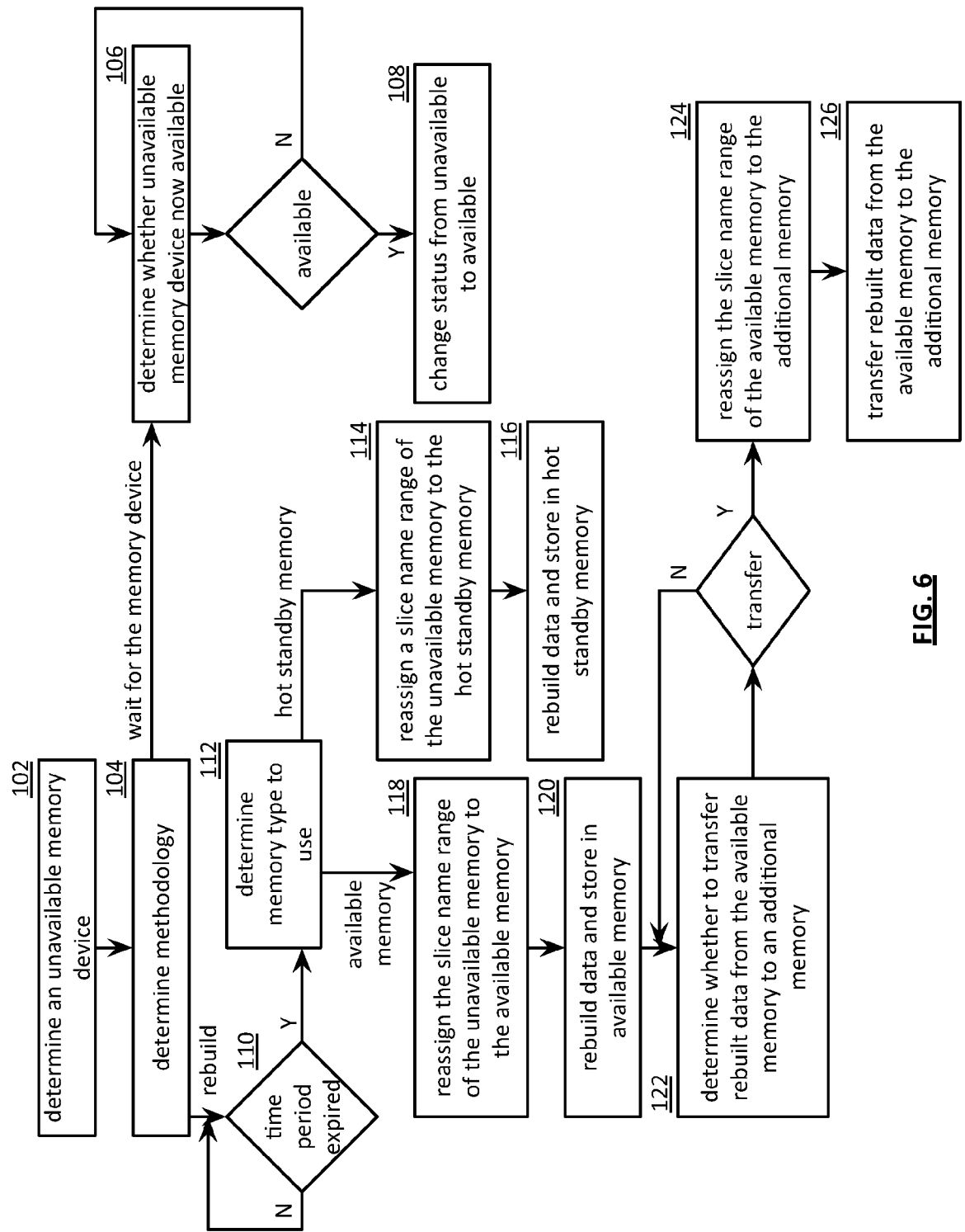
FIG. 6 is a flowchart illustrating an example of managing a memory device in accordance with invention.

FIG. 6 is a flowchart illustrating an example of managing a memory device. The method begins with step 102 where a processing module determines whether a memory device of a dispersed storage (DS) unit is unavailable to produce an unavailable memory device. Such a determination may be based on one or more of a query, an indicator that the memory device has been physically removed, an error message, a plurality of error messages, a power indicator, a command, a message, and a failure indicator.

When the memory device is unavailable, the method continues at step 104 where the processing module determines a methodology regarding DS encoded data stored in the unavailable memory device based on one or more dispersed storage network (DSN) conditions to produce a determined methodology. Such one or more DSN conditions includes at least one of a decode threshold and pillar width ratio, a number of DS units in a vault that are unavailable, network traffic, and a priority level of the DS encoded data. Such a methodology includes waiting for the unavailable memory device to become available again (e.g., repaired) and rebuilding the DS encoded data after a time period to produce rebuilt DS encoded data and storing the rebuilt DS encoded data in one or more other available memory devices (e.g., a hot-standby memory device and/or a plurality of portions of a plurality of other memory devices of the available memory devices). The method continues to step 106 when the determined methodology includes waiting for the memory device to become available. The method branches to step 110 when the determined methodology includes a rebuilding component.

The method continues at step 106 where the processing module waits for the memory device to become available by determining whether the unavailable memory device is now available when the determined methodology includes waiting for the memory device to become available. The method repeats to step 106 when the processing module determines that the unavailable memory device is not available. The method continues to step 108 when the processing module determines that the unavailable memory is now available. The method continues at step 108 where the processing module changes the status of the memory device from unavailable to available when the unavailable memory device becomes available.

The method continues at step 110 where the processing module establishes a time period based on the one or more DSN conditions when the determined methodology includes the rebuilding component and determines whether the time period expires. For example, the processing module establishes the time period to be two days in accordance with the determined methodology, including avoiding utilizing network bandwidth to rebuild the DS encoded data. The method repeats to step 110 when the processing module determines that the time period has not expired. The method continues to step 112 when the processing module determines the time period has expired.

The method continues at step 112 where the processing module determines a memory type to utilize by determining whether a DS unit includes a hot-standby memory device. Such a determination may be based on one or more of a query, a message, a registry, a list, a lookup, a command, and a request. When the DS unit includes the hot-standby memory device, the processing module determines, in accordance with the determined methodology, whether to use the hot-standby memory device, wherein available memory of the DS unit includes the hot-standby memory device. The method branches to step 118 when the processing module determines to utilize available memory (e.g., other than the hot-standby memory device). The method continues to step 114 when the processing module determines to utilize the hot-standby memory device.

The method continues at step 114 where the processing module reassigns a slice name range associated with the unavailable memory device to the hot-standby memory device prior to the storing rebuilt DS encoded data when the hot-standby memory device is to be used. Such reassigning of the slice name range includes updating the slice name range in a memory device table from the unavailable memory device to the hot-standby memory device.

The method continues at step 116 where the processing module initiates, in accordance with the determined methodology, a rebuilding function to rebuild the DS encoded data to produce rebuilt DS encoded data and storing the rebuilt DS encoded data within the hot-standby memory device of the DS unit. Such a rebuilding function may include at least one of executing the rebuilding function to rebuild the DS encoded data and requesting execution of the rebuilding function to rebuild the DS encoded data (e.g., sending a rebuilding request message to at least one of a storage integrity processing unit, a DS processing unit, and a DS unit).

The method continues to step 118 where the processing module reassigns the slice name range associated with the unavailable memory device to the available memory of the DS unit prior to the storing the rebuilt DS encoded data when the available memory is to be used. Such reassigning of the slice name range includes at least one of updating the slice name range in the memory device table from the unavailable memory device to the available memory of the DS unit and when the available memory of the DS unit includes a plurality of memory devices, partitioning the slice name range into a plurality of slice name range partitions and assigning one of the plurality of slice name range partitions to one of the plurality of memory devices and updating a status indicator of the unavailable memory (e.g., changing a status from unavailable to available). Such partitioning of the slice name ranges may be based on one or more of slice name address range indicators for the plurality of memory devices, available capacity indicators for the plurality of memory devices, a slice redistribution policy, a slice storage requirement, a performance indicator, a security indicator, a priority indicator, and an estimation of performance.

The method continues at step 120 where the processing module initiates the rebuilding function and stores the rebuilt DS encoded data within available memory of the DS unit. The method continues at step 122 where the processing module determines whether to transfer the rebuilt DS encoded data from the available memory of the DS unit to an additional memory of the DS unit. Such additional memory of the DS unit may include at least one of refurbished memory and new memory. Such a determination may be based on one or more of a memory capacity indicator associated with the additional memory, a performance indicator associated with the additional memory, a message, a request, and a command. For example, the processing module determines to transfer the rebuilt DS encoded data from the available memory to the additional memory when a new memory is detected and a capacity indicator associated with the new memory compares favorably to an amount of rebuilt DS encoded data. The method repeats back to step 122 when the processing module determines to not transfer the rebuilt DS encoded data. The method continues to step 124 when the processing module determines to transfer the rebuilt DS encoded data.

The method continues at step 124 where the processing module reassigns a slice name range associated with the available memory of the DS unit to the additional memory when the rebuilt DS encoded data is to be transferred from the available memory of the DS unit to the additional memory. The method continues at step 126 where the processing module transfers the rebuilt DS encoded data from the available memory of the DS unit to the additional memory. In addition, the processing module may delete the rebuilt DS encoded data from the available memory when the rebuilt DS encoded data is successfully stored in the additional memory.

FIG. 7A is a flowchart illustrating an example of authorizing an access request. The method begins with step 136 where a processing module receives an access request. Such an access request may include one or more of a user identifier (ID), an access type (e.g., read, write, delete, list, list range, check, etc.), a user password, a user realm indicator, a command, a data object name, a data object, a virtual dispersed storage network (DSN) address, a performance indicator, a priority indicator, a security indicator, access request requirements, a vault ID, a DSN system element access request, a DSN resource request, a vault access request, and a record access request. The processing module may receive the access request from one or more of a user device, the dispersed storage (DS) processing unit, a storage integrity processing unit, a DS managing unit, and a DS unit.

The method continues at step 138 where the processing module determines the realm. Such a realm indicates an affiliation of one or more user devices/users. For example, the realm indicates a group associated with a particular organization (e.g., a company, a team, a family, a work group, a social group, a community, a geographic region, etc.). Such a determination of the realm may be based on one or more of user information, realm information, an authorization table lookup, a received realm indicator, a user ID, a user password, a vault lookup, a table lookup, and any other information from the access request.

The method continues at step 140 where the processing module determines an authorization service. Such an authorization service indicates an identity and/or address to provide subsequent authorization of the access request. For example, the processing module identifies the authorization service to include a third-party, which may or may not be part of the DSN computing system. Such a third-party may provide authorization information (e.g., if a user or group is allowed to perform a particular type of DSN computing system access). Such a determination of the authorization service may be based on one or more of information associated with the realm, an authorization table lookup, a vault lookup, a user ID, a user password, and information received in the access request.

The method continues at step 142 where the processing module generates an authorization request and sends the authorization request to the authorization service. Such an authorization request may include one or more of the user ID, a user password, user information, the user realm information, a command, the data object name, a virtual DSN address, and a DS processing module ID. The method continues at step 144 where the processing module receives an authorization request response from the authorization service. The method continues at step 146 where the processing module determines whether the request is authorized based on the authorization request response. The method ends at step 148 where the processing module sends a reject message when the processing module determines that the request is not authorized. The processing module may send the reject message to the requester and/or the DS managing unit. The method continues to step 150 when the processing module determines that the request is authorized. The method continues at step 150 where the processing module processes the access request (e.g., processes a command including store, retrieve, delete, list, etc.).

FIG. 7B is a diagram illustrating an example of an authorization table 152. Such an authorization table 152 may be utilized by a processing module to determine an authorization service based on user information as discussed with reference to the method of FIG. 7A. Such an authorization table 152 may be stored in one or more of a dispersed storage (DS) unit, a DS managing unit, a storage integrity processing unit, a user device, and a DS processing unit. In an example, the DS managing unit generates the authorization table 152 and sends the information of the authorization table 152 to the DS unit for storage and ongoing use to authorize access requests.

Such an authorization table 152 includes a user information field 154, a realm field 156, and an authorization service field 158. The user information field 154 includes identities of one or more users and/or user devices associated, wherein each user is associated with a particular realm. For example, an e-mail address may be utilized to uniquely identify a user and/or user device. The realm field 156 includes group identities associated with the one or more users. For example, a realm entry identifies a domain of an e-mail address such that a shared affiliation is a common e-mail domain (e.g., a company, an organization, etc.). The authorization service field 158 includes an identity and address of an associated authorization service corresponding to a realm. For example, an entry of the authorization service field 158 indicates an Internet address that may be utilized to send an authorization request to and receive a corresponding authorization request response.

In an example of operation, an e-mail address of joew@cleversafe.com is utilized to index into the authorization table 152 by matching e-mail address to an entry of the user information field 154. An associated realm of cleversafe.com is extracted from the realm field 156 based on a corresponding e-mail address entry matched to an entry of the associated realm. Next, an authorization service address of 1daps.cleversafe.com is extracted from the authorization service field 158 based on the corresponding e-mail address entry matched to an entry of the associated authorization service. An access request authorization message is sent to the 1daps.cleversafe.com address to determine whether an associated access request is authorized.

Figure 8A:
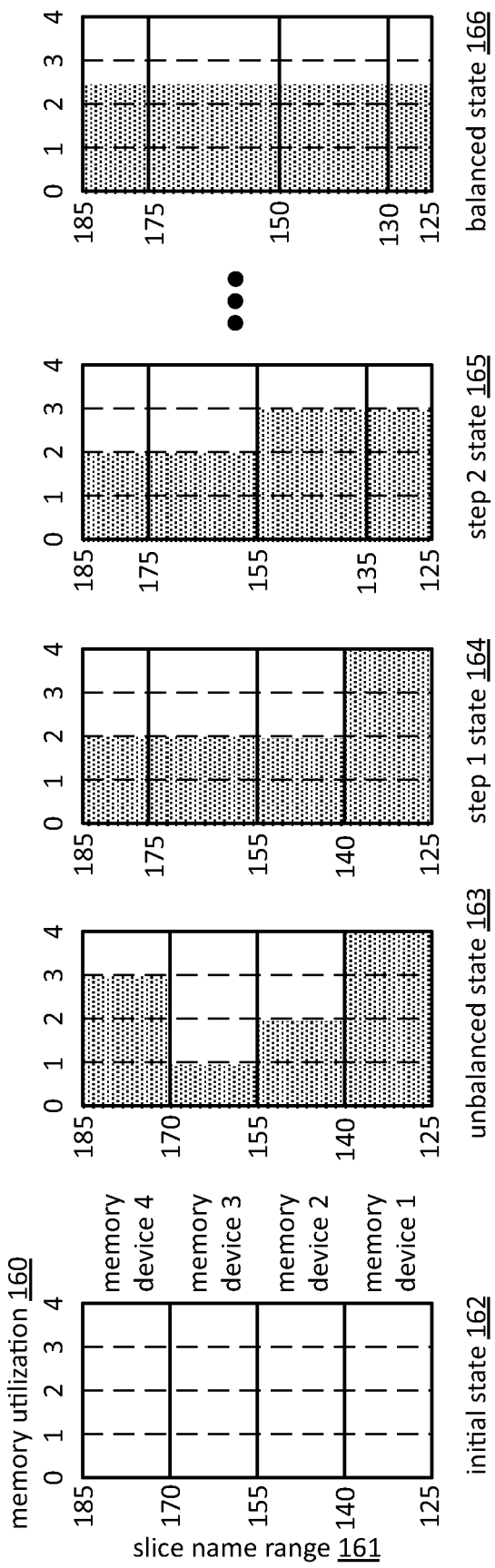
FIG. 8A is a diagram illustrating an example of a memory utilization map sequence in accordance with invention.

FIG. 8A is a diagram illustrating an example of a memory utilization map sequence that includes a sequence of memory utilization map states 162-166. Each memory utilization map state of the memory utilization map states 162-166 represents a memory utilization level 160 (e.g., 0, 1, 2, 3, 4 terabytes (TB)) of a plurality of memory devices 1-4 corresponding to a state of memory utilization of the sequence of memory utilization map states 162-166. Such memory devices 1-4 include memory devices (e.g., Flash memory, random access memory, magnetic disk drive memory, etc.) within one of a common dispersed storage (DS) unit and two or more DS units. For example, memory devices 1-4 are implemented in DS unit 1. In another example, memory devices 1-2 are implemented in DS unit 1 and memory devices 3-4 are implemented in DS unit 2. As yet another example, memory device 1 is implemented in DS unit 1, memory device 2 is implemented in DS unit 2, memory device 3 is implemented in DS unit 3, and memory device 4 is implemented in DS unit 4.

Encoded data slices corresponding to a slice name range 161 (e.g., 125-185) are stored in the memory devices 1-4 in accordance with slice name ranges associated with each memory device of the memory devices 1-4. Such a slice name range 161 includes (m−1) address boundaries to form the slice name ranges associated with each memory device of the memory devices 1-4, wherein m=a number of memory devices 1-4. For instance, 3 address boundaries form the slice name ranges associated with each memory device when there are 4 memory devices. Such address boundaries may be determined based on one or more of a memory balancing function, a memory balancing goal, an impact threshold, a memory utilization map state, previous address boundaries, a number of memory devices, a memory utilization level of each of the memory devices 1-4 (e.g., the utilization level rises as more encoded data slices are stored), and the slice name range 125-185.

Such a sequence of memory utilization map states 162-166 may correspond to an initial state 162, a balanced state 166, and one or more intermediate states 163-165. Such an initial state 162 represents a memory utilization map state when memory devices 1-4 are initially assigned to the slice name range 161 (e.g., memory devices 1-4 are unutilized and assigned). Such a balanced state 166 represents a memory utilization map state when memory devices 1-4 are utilized and balanced as a result of applying the memory balancing function. Such intermediate states 163-165 includes an unbalanced state 163 and may include one or more intermediate steps (e.g., step 1 state 164, step 2 state 165) in application of the memory balancing function to transition the memory devices 1-4 from the unbalanced state 163 to the balanced state 166). Such an unbalanced state 163 represents a memory utilization map state when memory devices 1-4 are utilized and unbalanced as a result of storing encoded data slices in accordance with address boundaries associated with the initial state 162.

Such a memory balancing function results in a memory utilization level of each memory device of the memory devices 1-4 being substantially the same (e.g., balanced state 166). Such a memory balancing function may be applied to the memory devices 1-4 by modifying the address boundaries associated with the address range 161 to produce modified slice name ranges of at least two the memory devices 1-4 and transferring encoded data slices from one memory device to another memory device in accordance with the modified slice name ranges. The memory balancing function may be applied in one or more steps to transition from the unbalanced state 163 to the memory state 166.

In an example of operation, address boundaries of 140, 155, and 170 form slice name ranges for each memory device of memory devices 1-4, when the memory devices 1-4 are assigned in the initial state 162. For instance, encoded data slices corresponding to a slice name range of 125-140 are stored in memory device 1, encoded data slices corresponding to a slice name range of 140-155 are stored in memory device 2, encoded data slices corresponding to a slice name range of 155-170 are stored in memory device 3, and encoded data slices corresponding to a slice name range of 170-185 are stored in memory device 4. Encoded data slices are stored in the memory devices 1-4 in accordance with the slice name ranges of each of the memory devices 1-4. For instance, 4 TB of encoded data slices are stored in memory device 1, 2 TB of encoded data slices are stored in memory device 2, 1 TB of encoded data slices are stored in memory device 3, and 3 TB of encoded data slices are stored in memory device 4 when the memory utilization map produces the unbalanced state 163.

In the example of operation continued, the memory balancing function is applied such that an address boundary between memory device 3 and memory device 4 is modified from 170 to 175 to produce a modified slice name range of 155-175 for memory device 3 and a modified slice name range of 175-185 for memory device 4. Encoded data slices associated with slice name addresses 170-175 are transferred from memory device 4 to memory device 3 such that memory device 3 and memory device 4 are each associated with a utilization level of 2 TB. Such an encoded data slice transfer and modified slice name ranges results in step 1 state 164.

Continuing with the example of operation, the memory balancing function is applied such that an address boundary between memory device 1 and memory device 2 is modified from 140 to 135 to produce a modified slice name range of 125-135 for memory device 1 and a modified slice name range of 135-155 for memory device 2. Encoded data slices associated with slice name addresses 135-140 are transferred from memory device 1 to memory device 2 such that memory device 1 and memory device 2 are each associated with a utilization level of 3 TB. Such an encoded data slice transfer and modified slice name ranges results in step 2 state 165. Next, the memory balancing function is further applied and may include more steps resulting in more intermediate states to reach the balanced state 166 where each memory device is associated with a utilization level of 2.5 TB.

In another example of operation, the memory balancing function is applied to the memory devices in the unbalanced state 163 to move directly to the balanced state 166 (e.g., without moving through one or more intermediate states 164-165). The method of operation of the balancing function is discussed in greater detail with reference to FIG. 8B.

FIG. 8B is a flowchart illustrating an example of balancing memory utilization. The method begins with step 168 where processing module identifies a memory loading mismatch between two or more memory devices of a plurality of memory devices of a dispersed storage (DS) unit, wherein each of the plurality of memory devices is assigned a range of slice names to provide a plurality of assigned ranges of slice names. For example, the processing module identifies a memory loading mismatch between a first memory device and a second memory device of the DS unit, wherein the first memory device is assigned a first range of slice names and the second memory device is assigned a second range of slice names.

Such identifying of the memory loading mismatch includes at least one of determining a utilized amount of storage for each of the plurality of memory devices (e.g., based on one or more of a query, a list, a ping, a message, a command, an error message, and a lookup), determining an unutilized amount of storage for each of the plurality of memory devices, determining a utilization percentage of storage capacity for each of the plurality of memory devices, determining an unutilized percentage of storage capacity for each of the plurality of memory devices, and determining a storage balancing factor for a group of encoded data slices associated with at least one of a priority indicator, a security indicator, a performance indicator, a user identifier, and a vault identifier. Alternatively, or addition to, such identifying of the memory loading mismatch includes at least one of determining a utilized amount of storage for each of the first and second memory devices, determining an unutilized amount of storage for each of the first and second memory devices, determining a utilization percentage of storage capacity for each of the first and second memory devices, and determining an unutilized percentage of storage capacity for each of the first and second memory devices when the memory loading mismatch is to be identified between the first memory device and the second memory device.

The method continues at step 170 where the processing module determines an estimated impact to reduce the memory loading mismatch. Such determining of the estimated impact comprises at least one of determining a financial impact based on one or more of a cost level and a revenue gain/loss level, determining a processing resource impact based on one or more of a memory capacity extension time period, a balancing execution time period, a performance level, a wide area network bandwidth utilization level to execute load balancing, and a local area network bandwidth utilization level to execute the load balancing, determining an accessibility impact based on one or more of a wide area network bandwidth availability level, a local area network bandwidth availability level, a memory unavailability time period, and balancing execution time, and determining a user impact based on one or more of a security level, a priority level, an associated user identifier (ID), and an associated vault ID.

The method continues at step 172 where the processing module determines whether the estimated impact compares favorably to an impact threshold. For example, the processing module determines that the estimated impact compares favorably to the impact threshold when the balancing execution time is less than the impact threshold. As another example, the processing module determines that the estimated impact compares favorably to the impact threshold when the revenue gain is greater than the impact threshold. The method repeats back to step 168 when the processing module determines that the estimated impact compares unfavorably to the impact threshold. The method continues to step 174 when the processing module determines that the estimated impact compares favorably to the impact threshold.

The method continues at step 174 where the processing module modifies at least two of the plurality of assigned ranges of slices names to produce a modified plurality of assigned ranges of slice names for the plurality of memory devices based on the memory loading mismatch when the estimated impact compares favorably to an impact threshold. For example, processing module modifies the first and second ranges of slices names to produce a first modified range of slice names for the first memory device and a second modified range of slice names for the second memory device based on the memory loading mismatch.

Such modifying of the at least two of the plurality of assigned ranges of slices names includes de-assigning a first range of slice names from a first memory device of the at least two memory devices and a second range of slice names from a second memory device of the at least two memory devices to create an unassigned range of slice names and partitioning the unassigned range of slices names to approximately balance (e.g., same utilization level) loading of the first and second memory devices to produce the modified plurality of assigned ranges of slice names. For example, the processing module modifies the first and second ranges of slice names to include de-assigning the first and second ranges of slice names from the first and second memory devices to create the unassigned range of slice names and partitioning the unassigned range of slices names to approximately balance loading of the first and second memory devices to produce first and second modified ranges of slice names.

The method continues at step 176 where the processing module transfers one or more encoded data slices between two or more memory devices of the plurality of memory devices in accordance with the modified plurality of assigned ranges of slice names. Alternatively, or in addition to, the processing module transfers one or more encoded data slices between the first and second memory devices in accordance with the first and second modified ranges of slice names.

FIG. 9A is a flowchart illustrating an example of managing memory usage. The method begins with step 178 where a processing module receives usage information for a vault. Such usage information pertains to one or more users and/or user devices associated with the vault and may include one or more of a utilization storage volume, a utilization percentage of allocated storage, a utilization percentage of all storage, and a utilization comparison to at least one other vault. The processing module may receive the usage information from one or more of a dispersed storage (DS) unit, a user device, a storage integrity processing unit, a DS processing unit, and a DS managing unit. The processing module receives the usage information based on one or more of a response to a query, as an unsolicited message, from time to time, subsequent to a dispersed storage network (DSN) memory access, and a command from a DS managing unit. For example, the processing module sends a query to DS units 1-5 and receives the utilization storage volume usage information for vault 102 from DS units 1-5 of a DS unit storage set assigned to vault 102.

The method continues at step 180 where the processing module aggregates the usage information to produce aggregated usage information based on one or more of user device identifier (ID), a user ID, a vault ID, a predefined group, a realm, a geography, a DS unit storage set, and a DS unit. For example, the processing module aggregates the usage information from DS units 1-5 for vault 102 to produce aggregated usage information corresponding to vault 102.

The method continues at step 182 where the processing module sends at least one of the usage information and the aggregated usage information to one or more of a user device, a DS processing unit, a storage integrity processing unit, a DS unit, and a DS managing unit. For example, the processing module sends aggregated usage information to user device 457 when user device 457 is affiliated with vault 102. The method continues at step 184 where the processing module determines whether the aggregated usage information for user device 457 compares favorably to a hard quota. Such a hard quota may specify a usage information value such that action is required (e.g., preventing incremental storage usage). The processing module may obtain the hard quota based on one or more of a vault lookup, a hard quota list, a predetermination, DSN memory usage information, a dynamic value based in part on overall DSN memory usage information, an error message, and a command. For example, the comparison is favorable when the aggregated usage information (e.g., 2 terabytes) is less than the hard quota (e.g., 5 terabytes). The method repeats back to step 178 when the processing module determines that the usage information compares favorably to the hard quota. The method continues to step 186 when the processing module determines that the usage information compares unfavorably to the hard quota.

The method continues with step 186 where the processing module disables write permissions for the corresponding vault. Such disabling of write permissions curtails further usage of the DSN memory storage facilities. Such disabling of the write permissions may be executed by one or more of a registry update, a user vault update, a table update, sending a message to the DS managing unit, and sending a message to the user device. The method continues at step 188 where the processing module sends a write permissions message to one or more DS units affiliated with the vault. Such write permissions message may include one or more of a vault ID, one or more user device IDs, one or more user IDs, a message indicating that the write permissions are disabled for the vault ID, aggregated usage information, and usage information.

Alternatively, or in addition to, the processing module may from time to time re-determine if the usage information compares favorably to the hard quota. Next, the processing module enables the write permissions for the vault when the comparison is favorable. For example, encoded data slices corresponding to the vault are deleted enabling the comparison to be favorable when the hard quota is substantially the same as a previous hard quota. In another example, a value associated with the hard quota is raised enabling the comparison to be favorable.

FIG. 9B is a flowchart illustrating another example of managing memory usage. The method begins with step 190 where a processing module determines to store data. For example, the processing module determines to store a data object. As another example, the processing module determines to store an encoded data slice. Such a determination to store data may be based on one or more of a user input, a storage algorithm, an application output, a message, a predetermination, and a command.

The method continues at step 192 where the processing module determines usage information. Such a determination may be based on one or more of retrieving locally stored usage information, retrieval from a dispersed storage (DS) processing unit, retrieval from a DS managing unit, a query, a message, and command. For example, the processing module saves usage information locally (e.g., within a user device). For instance, the processing module retrieves locally stored usage information to determine that the user device has stored 1.5 terabytes of data so far in a dispersed storage network (DSN) memory.

The method continues at step 194 where the processing module determines whether the usage information compares favorably to a soft quota. Such a soft quota may specify a usage information value such that action is required (e.g., preventing incremental storage usage). The processing module may obtain the soft quota based on one or more of a vault lookup, a soft quota list, a predetermination, DSN memory usage information, a dynamic value based in part on overall DSN memory usage information, an error message, and a command. For example, the processing module determines that the usage information compares unfavorably to the soft quota when the usage information includes 1.5 terabytes of storage utilization and the soft quota is 1.0 terabytes.

The method branches to step 198 when the processing module determines that the usage information compares favorably to the soft quota. The method ends at step 196 where the processing module rejects the store operation when the processing module determines that the usage information compares unfavorably to the soft quota. Such rejecting of the store operation includes one or more of sending a message to a requester, sending a message to a DS managing unit, sending a message to a DS processing unit, and preventing further store operations until the comparison is favorable. The method continues at step 198 where the processing module sends data to store when the processing module determines that the usage information compares favorably to the soft quota. For example, the processing module sends the data object to a DS processing unit for storage in a DSN memory.

FIG. 9C is a flowchart illustrating another example of managing memory usage. The method begins with step 200 where a processing module receives a write slice request (e.g., a request to store a slice). Such a write slice request may include one or more of a vault identifier (ID), a user ID, a source name, a slice name, a write command, a priority indicator, a performance indicator, a security indicator, and an encoded data slice. The processing module may receive the write slice request from one or more of a user device, a dispersed storage (DS) processing unit, a storage integrity processing unit, a DS managing unit and another DS unit.

The method continues at step 202 where the processing module determines whether an associated vault of the write slice request is allowed write permissions. Such a determination may be based on one or more of a received vault ID, a write permissions table lookup utilizing the vault ID as an index, a user ID, a source name, a slice name, an encoded data slice, a priority indicator, a performance indicator, a security indicator, a message, a query, and a command. For example, the processing module determines the write permission is not allowed based on the write permissions table lookup for vault 102 when a write slice request is associated with the vault 102. The method branches to step 206 when the processing module determines that the vault is allowed write permissions. The method continues to step 204 when the processing module determines that the vault is not allowed write permissions.

The method continues at step 204 where the processing module rejects the write slice request when the processing module determines that the write permission is not allowed. Such rejecting of the write slice request includes one or more of sending a message to a requester, sending a message to a DS managing unit, sending a message to a DS processing unit, and preventing further processing of write slice requests for this vault. The method continues at step 206 where the processing module processes the write slice request (e.g., storing an associated encoded data slice in memory) when the processing module determines that the vault is allowed write permissions.

FIG. 10A is a diagram illustrating an example of a user role table 208 that may be utilized to stratify dispersed storage network (DSN) system users into roles for authorization purposes. Such a user role table 208 includes a user field 210 and a role field 212. The user field 210 and the role field 212 may include any number of entries. Such an entry of the user field 210 may be associated with two or more different entries of the role field 212. Such an entry of the role field 212 may be associated with two or more different entries of the user field 210. Such entries of the user field 210 include identifiers to identify one or more of a user, a user device, a dispersed storage (DS) processing module, a storage integrity processing unit, a DS managing unit, and a DS unit. Such entries of the role field 212 include level identifiers to identify predetermined authorized roles with respect to operation of the DSN system.

The user role table 208 may be utilized by one or more of a user device, a DS processing unit, a storage integrity processing unit, a DS managing unit, and a DS unit to determine a role of a user with respect to the DSN system. For example, a processing module of a DS processing unit may receive a request from user 831 to access contents of a vault. The processing module determines the role of user 831 to be a vault user based on a lookup of the user role table 208 utilizing user 831 as an index.

FIG. 10B is a diagram illustrating an example of a role permissions table 214 that may be utilized to determine permissions for authorization purposes. Such a role permissions table 214 includes a role field 212 and a permissions field 216. The role field is as previously described with reference to FIG. 10A, wherein an entry of the role field 212 is associated with an entry of the permissions field 216. Such a permissions field 216 includes any number of permissions entries, wherein each permissions entry indicates permitted activities associated with a corresponding role entry of the role field 212. Such a permissions entry of the permissions entries may be associated with two or more different entries of the role field 212.

Such a permissions entry of the permissions field 216 indicates permitted activities for a corresponding role entry of the role field 212. Alternatively, or in addition to, the permissions entry of the permissions field 216 indicates non-permitted activities for the corresponding role entry of the role field 212. For example, the role permissions table 214 indicates that a super user role does not have permissions to write to or read from a vault but does have permissions to execute any other operations except for writing and reading to and from a vault. As another example, the role permissions table 214 indicates that a system administrator role as permissions to read and write from any vault, perform account management operations (e.g., activating users, activating vaults, billing, usage summary generation), but does not have permissions to perform any security operations (e.g., change security parameters such as which user has access to what data, security policies, network element activation, permissions). As yet another example, the role permissions table 214 indicates that a security officer role has permissions to perform security account manager operations. As a further example, the role permissions table 214 indicates that an operator role has permissions to execute performance monitoring functions (e.g., an operator of the DSN system may monitor the performance and utilization of the DSN system including encoded data slice retrieval monitoring, activity monitoring, throughput, failures, resource utilization, network use, central processing unit use, device load etc.). As yet a further example, the role permissions table 214 indicates that a vault user role has permissions to read from and/or write to a vault with no other allowed permissions. The method of utilization of the user role table 208 and the role permissions table 214 is discussed in greater detail with reference to FIG. 10C.

FIG. 10C is a flowchart illustrating another example of authorizing an access request, which includes some of steps to FIG. 7A. The method begins with step 136 of FIG. 7A where a processing module receives an access request. The method continues at step 220 where the processing module determines a user identifier (ID) associated with the access request. Such a determination may be based on one or more of a received user identifier (ID), a vault ID, information contained in the request, a vault lookup, a table lookup, a predetermination, a message, a message, and a command.

The method continues at step 222 where the processing module determines a role associated with the user ID. Such a determination may be based on one or more of the user ID, a user role table lookup, information received, a request, a message, a query, a vault lookup, a predetermination, and command. For example, the processing module determines the role to be a security officer when the processing module utilizes a received user ID of 236 as an index to lookup the role in the user role table.

The method continues at step 224 where the processing module determines permissions associated with the role. Such a determination may be based on one or more of the user ID, a vault ID, information contained in the request, the role, a role permissions table lookup, a query, a vault lookup, a table lookup, a predetermination, and a command. For example, the processing module determines the permissions to include security account manager functions when the processing module utilizes the security officer role as an index to lookup the permissions in the role permissions table lookup.

The method continues at step 226 where the processing module determines whether the user ID is allowed to perform access request actions associated with the access request. Such a determination may be based on a comparison of the request to the permissions. For example, the processing module determines that the user is allowed when the processing compares a security record access request to the determined security account manager permissions. As another example, the processing module determines that the user is not allowed when the processing compares a security record access request to a determined vault write request. The method branches to step 230 when the processing module determines that the user ID is allowed. The method continues to step 228 when the processing module determines that the user ID is not allowed.

The method continues at step 228 where the processing module rejects the request when the processing module determines that the user is not allowed. Such rejecting of the request includes sending a reject message to one or more of a user device, a DS managing unit, a DS processing unit, a storage integrity processing unit, and a DS unit. Such a reject message includes access request information based on the access request and a reject status indicator. The method continues at step 230 where the processing module processes the access request (e.g., allowing access to DSN system resources) when the processing module determines that the user ID is allowed.

Figure 11:
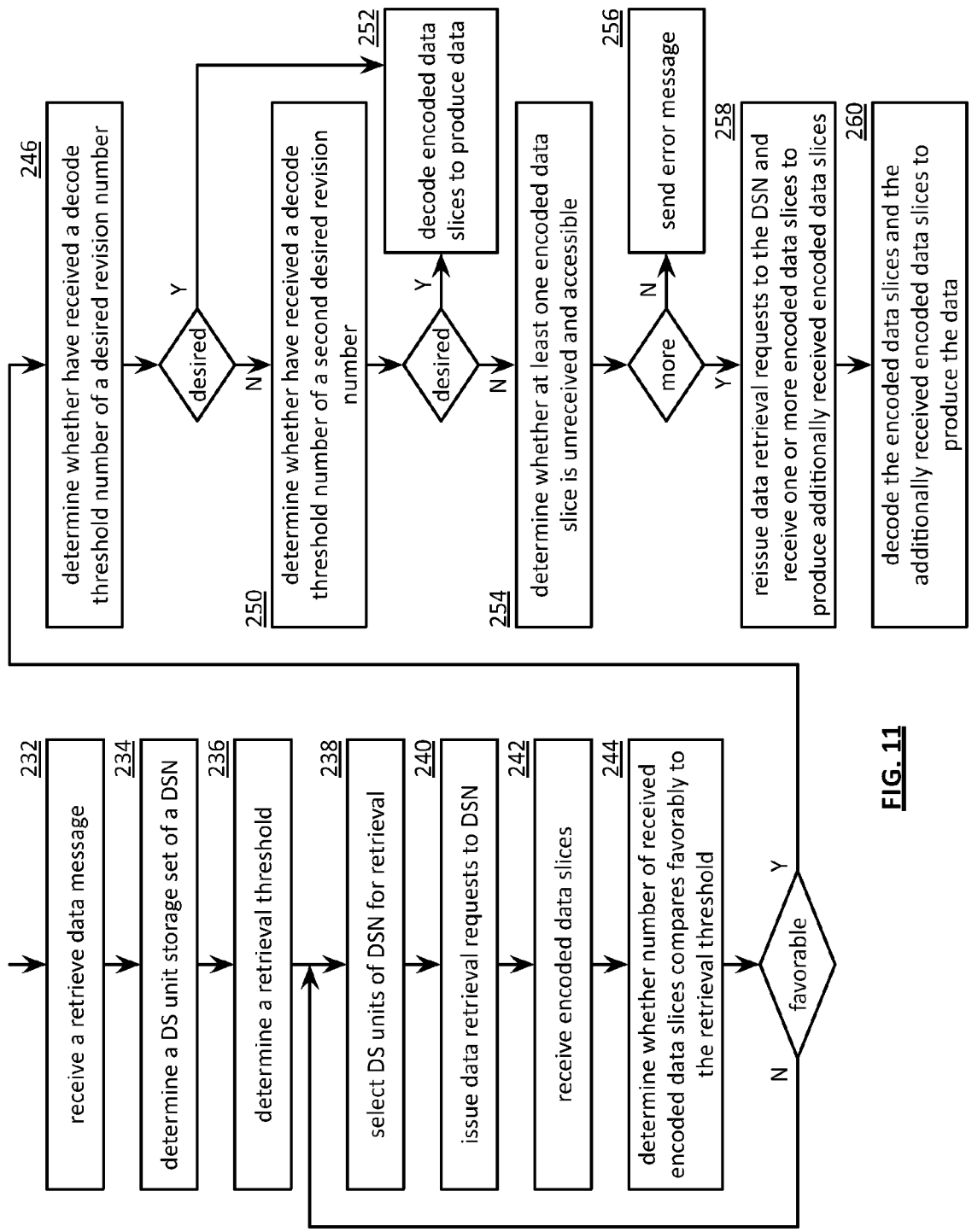
FIG. 11 is a flowchart illustrating an example of retrieving data in accordance with invention.

FIG. 11 is a flowchart illustrating an example of retrieving data. The method begins with step 232 where processing module receives a retrieve data message from a requester to retrieve data (e.g., a user device, a dispersed storage (DS) processing module, a storage integrity processing unit, a DS managing unit, and a DS unit). Such a retrieve data message may include one or more of a user identifier (ID), a user device ID, a request code, a date ID, a data object name, a data file name, a source name, a data type indicator, a data object hash, a vault ID, a data size indicator, a performance indicator, a priority indicator, a security indicator, a storage requirement, a consistency requirement, and a retrieval threshold requirement.

The method continues at step 234 where the processing module determines DS unit storage set of a dispersed storage network (DSN), wherein the DS unit storage set stores a plurality of sets of encoded data slices corresponding to the data. Such a determination may be based on one or more of information received in the retrieve data message, metadata associated with the data, a message, a predetermination, and a virtual DSN address to physical location table lookup. For example, the processing module determines at least one set of slice names associated with the data based on the user ID, the vault ID, and the data ID. Next, the processing module looks up identifiers associated with the DS unit storage set in the virtual DSN address to physical location table based on the at least one set of slice names.

At step 234, the processing module determines error coding dispersal storage function parameters. Such parameters of the error coding dispersal storage function parameters includes a pillar width, a write threshold, a consistency threshold, a special threshold, a read threshold, a preliminary retrieval threshold, a retrieval threshold, a read threshold, and a decode threshold. Such a determination may be based on one or more of information received in the retrieve data message, the DS unit storage set, a vault lookup, a command, a message, and a predetermination. A set of encoded slices may include two or more groups of encoded data slices, wherein each group of the one or more groups of encoded data slices is associated with a decode threshold number of the encode data slices of a common revision level when the pillar width is at least twice the decode threshold.

The processing module may retrieve and decode the two or more groups of encoded data slices to produce two or more different data segments associated with a set of encoded data. For example, the processing module retrieves and decodes a first group of encoded data slices of the set of encoded data slices from DS units 1-5 to produce a first data segment and retrieves and decodes a second group of encoded data slices of the set of encoded data slices from DS units 6-10 to produce a second data segment when the pillar width n=10 and the decode threshold k=5. In an instance, the first data segment and the second data segment are substantially the same when the first group of encoded data slices and the second group of encoded data slices are associated with a common revision level. In another instance, the first data segment and the second data segment are not substantially the same when the first group of encoded data slices are associated with a first revision level and the second group of encoded data slices are associated with a second revision level that is different than the first revision level.

The method continues at step 236 where the processing module determines a retrieval threshold for retrieving a set of encoded data slices from DSN, wherein the set of encoded data slices represents data (e.g., a data segment) encoded using a dispersed storage error encoding function having a pillar width of "n", a decode threshold of "k", and an encoding ratio of n−k>k and wherein the retrieval threshold is in accordance with the encoding ratio. Such determining of the retrieval threshold includes determining whether at least a write threshold number of the set of encoded data slices have a desired revision level. Such a desired revision level includes at least one of a most recent revision level, a predetermined revision level, a requested revision level, and a revision level associated with one or more recent favorable write commit response messages. For example, the processing module determines that at least a write threshold number of the set of encoded data slices have a most recent revision level of 457 when one or more recent favorable write commit response messages indicate the at least the write threshold number of encoded data slices associated with revision level 457 were successfully stored in the DS unit storage set.

At step 236, the processing module establishes the retrieval threshold based on the pillar width, the write threshold, and a first constant when the at least the write threshold number of the set of encoded data slices have the desired revision level. For example, the processing module determines the retrieval threshold in accordance with the formula retrieval threshold=n−WT+1. For instance, the processing module establishes the retrieval threshold to be 16 when the pillar width is 30, the write threshold is 15, and the first constant is 1. Such establishing of the retrieval threshold may provide a system improvement by eliminating the possibility that another group of a write threshold number of encoded data slices exists in the DS unit storage set, wherein the another group of the read threshold number of encoded data slices are associated with a common revision level and are unavailable (e.g., DS unit off-line, a network failure).

At step 236, the processing module establishes the retrieval threshold based on the pillar width, the decode threshold, and a second constant when the at least the write threshold number of the set of encoded data slices does not have the desired revision level. For example, the processing module determines the retrieval threshold in accordance with the formula retrieval threshold=n−k+1. For instance, the processing module establishes the retrieval threshold to be 21 when the pillar width is 30, the decode threshold is 10, and the second constant is 1. Such establishing of the retrieval threshold may provide a system improvement by eliminating the possibility that another group of encoded data slices exists in the DS unit storage set, wherein the another group of encoded data slices are associated with a common revision level and are unavailable (e.g., DS unit off-line, a network failure).

The method continues at step 238 where the processing module selects DS units for retrieval from the DS unit storage set to produce selected DS units. Such a selection may be based on one or more the DS unit storage set, the error coding dispersal storage function parameters, the retrieval threshold, DS unit performance history, a number of encoded data slices retrieved so far, a comparison of the encoded data slices retrieved so far to the retrieval threshold, retrieval requirements, DS units that are known to have successfully stored a most recent revision, DS unit attributes, DS unit status, DS unit availability, estimated DS unit performance, estimated DS units reliability, estimated DS unit availability, and DS unit cost.

The method continues at step 240 where the processing module issues data retrieval requests to the DSN (e.g., to the selected DS units) for the set of encoded data slices. The method continues at step 242 where the processing module receives encoded data slices of the set of encoded data slices to produce received encoded data slices. The method continues at step 244 where the processing module determines whether a number of received encoded data slices compares favorably to the retrieval threshold. For example, the processing module determines that the number of received encoded data slices compares favorably to the retrieval threshold when the number of encoded data slices is greater than or equal to the retrieval threshold. As another example, the processing module determines that the number of received encoded data slices compares favorably to the retrieval threshold by determining whether at least a decode threshold number of the received encoded data slices have a revision number corresponding to a desired revision level. In such a scenario, the processing module indicates a favorable comparison when the at least the decode threshold number of the received encoded data slices have the revision number corresponding to the desired revision level.

The method repeats back to step 238 when the processing module determines that the number of received encoded data slices does not compare favorably to the retrieval threshold. In such a scenario, the processing module may select different DS units of the DSN for retrieval to try again. The method continues to step 246 to decode the received encoded data slices to recapture the data when the number of received encoded data slices compares favorably to the retrieval threshold.

The method continues at step 246 where the processing module determines whether at least a decode threshold number of the received encoded data slices have a revision number corresponding to a desired revision level. The method branches to step 252 when the processing module determines that the at least the decode threshold number of received encoded data slices does have the revision number corresponding to the desired revision level. The method continues to step 250 when the processing module determines that the at least the decode threshold number of received encoded data slices do not have the revision number corresponding to the desired revision level.

The method continues at step 250 where the processing determines whether the at least the decode threshold number of the received encoded data slices have a revision number corresponding to a second desired revision level (e.g., when a second exists and prefer a second over the first) when the at least the decode threshold number of the received encoded data slices does not have the revision number corresponding to the desired revision level. The method branches to step 254 when the processing module determines that the at least the decode threshold number of received encoded data slices does not have the revision number corresponding to the second desired revision level. The method continues to step 252 when the processing module determines that the at least the decode threshold number of received encoded data slices does have the revision number corresponding to the second desired revision level. The method continues at step 252 where the processing module indicates a favorable comparison and decodes the received encoded data slices to recapture the data.

The method continues at step 254 where the processing module determines whether at least one encoded data slice of the set of encoded data slices is unreceived (e.g., not included in the received encoded data slices) and accessible (e.g., retrievable). Such determining includes determining a deficiency number of encoded data slices based on a difference between the decode threshold number and a number of the received encoded data slices that have the revision number corresponding to the desired revision level, determining whether at least the deficiency number of encoded data slices is unreceived and is accessible and indicating that the at least one encoded data slice of the set of encoded data slices is unreceived and accessible when the at least the deficiency number of encoded data slices is unreceived and is accessible, and indicating that the at least one encoded data slice of the set of encoded data slices is not unreceived or is not accessible when the at least the deficiency number of encoded data slices is not unreceived or is not accessible.

The method branches to step 258 when the processing module determines that the at least one encoded data slices is unreceived and accessible. The method continues to step 256 when the processing module determines that the at least one encoded data slices is not unreceived or is not accessible. The method continues at step 256 where the processing module sends an error message (e.g., to the requester, to a DS managing unit). Alternatively, the method repeats back to step 238 to try again (e.g., waiting for the at least one encoded data slices to become accessible).

The method continues at step 258 where the processing module reissues the data retrieval requests to the DSN for the at least one encoded data slice and receives one or more of the at least one encoded data slice to produce additionally received encoded data slices when the at least one encoded data slice of the set of encoded data slices is unreceived and accessible. The method continues at step 260 where the processing module decodes the received encoded data slices to recapture the data when a number of the received encoded data slices and the additionally received encoded data slices compares favorably to the retrieval threshold (e.g., have a decode threshold number of encoded data slices).

Alternatively, the processing module may utilize a consistency threshold (e.g., retrieval threshold=n−k+1) when accessing encoded data slices to be deleted. In such a scenario, there will be less than a write threshold number of encoded data slices remaining in the DS unit storage set. Alternatively, the processing module may utilize the consistency threshold when accessing encoded data slices to produce a rebuilt encoded data slice subsequent to re-creating a corresponding data segment. In such a scenario, the rebuilt encoded data slice is re-created from the DS unit storage set such that less than a write threshold number of encoded data slices are remaining in the DS unit storage set (e.g., implying that a latest visible revision may be utilized to produce the rebuilt encoded data slice). The method to produce a rebuilt encoded data slice associated an encoding ratio of n−k>k is discussed in greater detail with reference to FIG. 12.

Figure 12:
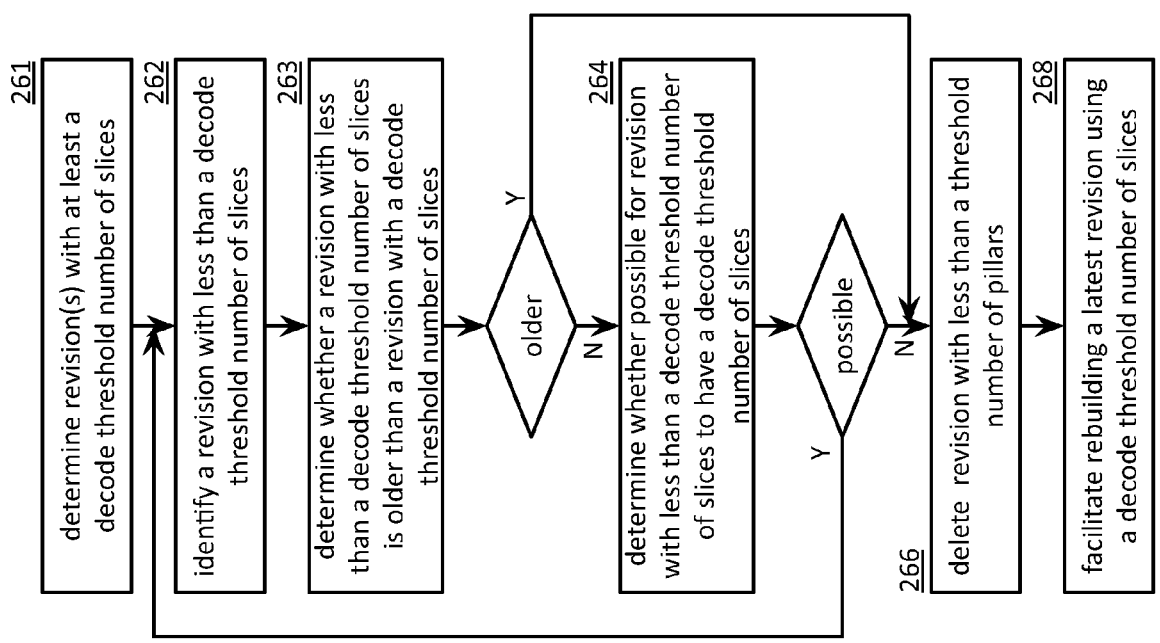
FIG. 12 is a flowchart illustrating an example of synchronizing a revision of stored data in accordance with the invention.
Figure 13:
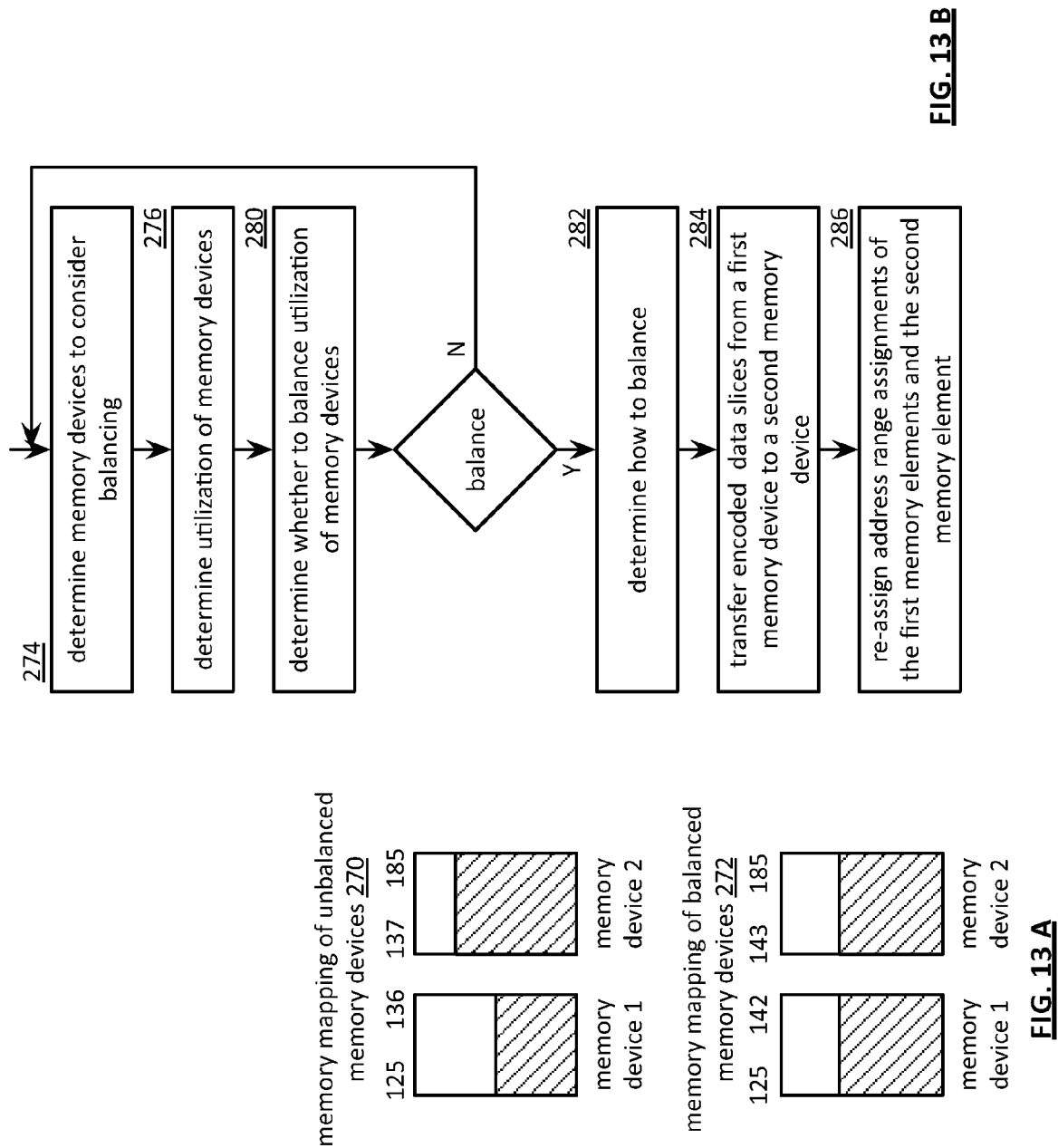
FIG. 13A is a diagram illustrating another example of a memory utilization map in accordance with invention.
FIG. 13B is a flowchart illustrating another example of balancing memory utilization in accordance with the invention.
Figure 14:
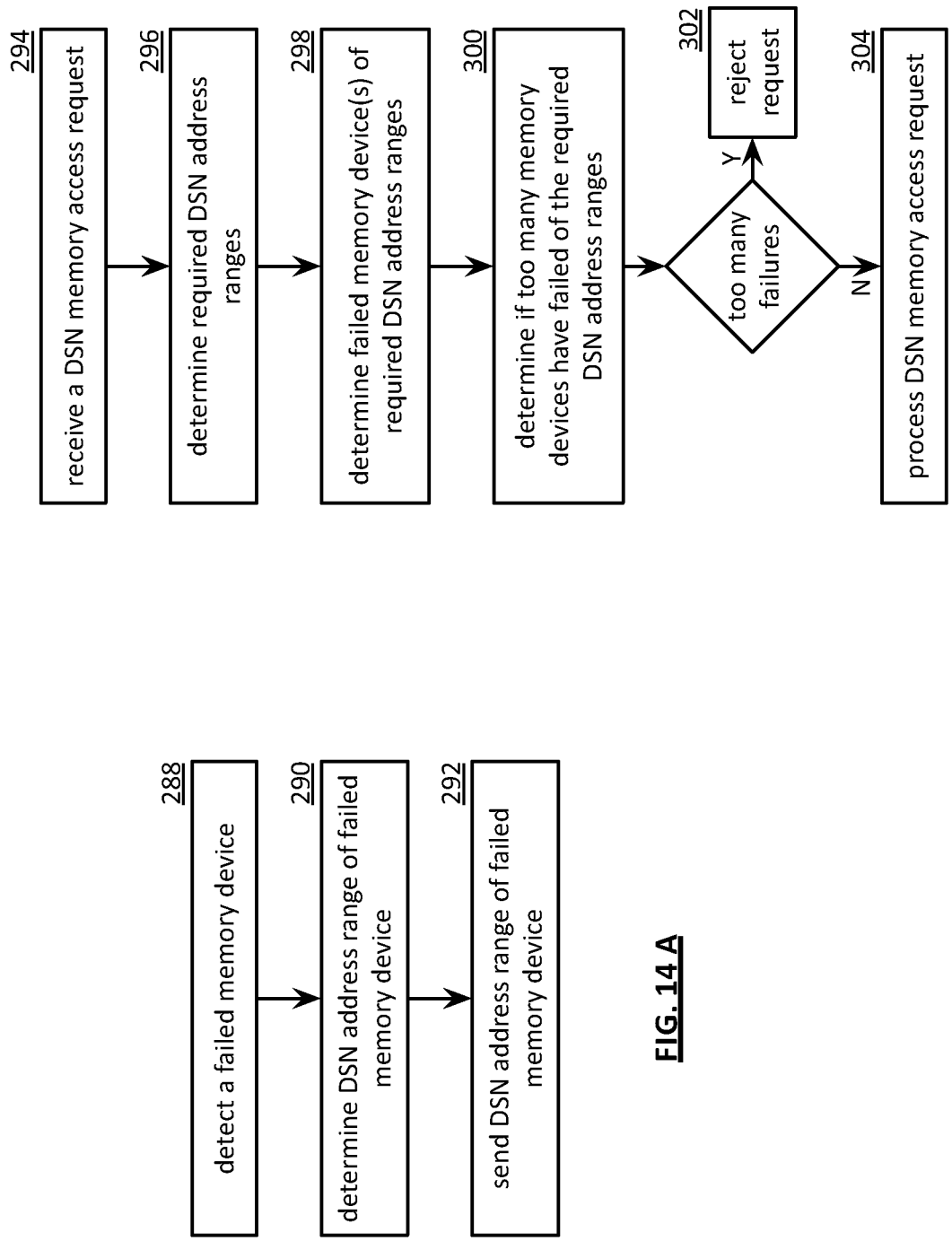
FIG. 14A is a flowchart illustrating an example of identifying a failed memory device in accordance with invention.
FIG. 14B is a flowchart illustrating an example of processing a memory access request in accordance with invention.

FIG. 12 is a flowchart illustrating an example of synchronizing a revision of stored data. Such synchronizing may include rebuilding an encoded data slice and/or deleting an un-required encoded data slice when the encoded data slice or the un-required encoded data slice are included in a set of encoded data slices where a pillar width n is at least twice a read threshold k. In such a scenario, the a processing module may decode a data segment to enable rebuilding of the encoded data slice from at least two groups of encoded data slices of a set of encoded data slices. For example, the processing module may dispersed storage error decode encoded data slices retrieved from dispersed storage (DS) units 1-5 or from DS units 6-10 to produce the data segment when the pillar width n=10 and the read threshold k=5. Such a data segment may be stored as two or more revisions when the pillar width n is at least twice the read threshold k and when an error occurred in a storage sequence (e.g., a decode threshold number of offline DS units miss the storage of a newer revision of the data segment).

The method begins with step 261 where a processing module determines revisions with at least a decode threshold number of encoded data slices. Such determining of the revisions includes retrieving encoded data slices and corresponding revision information from as many pillars as possible for a data segment that is stored in a DS unit storage set. Such determining of the revisions may occur when a DS unit is reactivated after being off-line and/or when a time period has elapsed since a previous determination of revisions.

The method continues at step 262 where the processing module identifies a revision with less than a decode threshold number of encoded data slices. The processing module may not be able to reconstruct the data segment corresponding to the revision when all of the encoded data slices were retrieved (e.g., a decode threshold number is not available). The processing module may be able to reconstruct the data segment corresponding to the revision when a number of unretrieved encoded data slices is greater than or equal to a number of encoded data slices required to decode the data segment (e.g., a difference between the decode threshold and a number of encoded data slices received so far of the same revision).

The method continues at step 263 where the processing module determines whether the revision with less than a decode threshold number of encoded data slices is older than a revision with a decode threshold number of encoded data slices. A storage capacity efficiency enhancement may be realized when slices of older revisions are deleted when slices of newer revisions exist that can be utilized to reconstruct a data segment. The method branches to step 266 when the processing module determines that the revision with less than a decode threshold number of encoded data slices is older than the revision with a decode threshold number of encoded data slices. The method continues to step 264 when the processing module determines that the revision with less than a decode threshold number of encoded data slices is not older than the revision with a decode threshold number of encoded data slices. In such a scenario, it may be possible to reconstruct a data segment associated with a newer revision if the decode threshold number of encoded data slices can be retrieved for the newer version (e.g., a decode threshold number of total as compared to what may have been received so far).

The method continues at step 264 where the processing module determines whether it is possible for the revision with less than a threshold number of pillars to have a threshold number of pillars. Such a determination may be based on comparing a difference between the pillar width and a number of encoded data slices received so far to a difference between the decode threshold and a number of encoded data slices received for the revision with less than a decode threshold number of pillars. The method repeats back to step 262 when the processing module determines that it is possible for the revision with less than a decode threshold number of pillars to have the decode threshold number of encoded data slices. The method continues to step 266 when the processing module determines that it is not possible for the revision with less than a decode threshold number of encoded data slices to have a decode threshold number of encoded data slices.

The method continues at step 266 where the processing module deletes encoded data slices associated with the revision with less than the decode threshold number of encoded data slices since it is not possible for the revision to have the decode threshold number of encoded data slices and/or the revision is older than a revision that it is available now. Such deletion includes sending a delete command with corresponding slice names to DS units to delete the slices of the revision with less than the decode threshold number of encoded data slices.

The method continues at step 268 where the processing module facilitates rebuilding a latest revision with a decode threshold number of encoded data slices. Such facilitating includes sending a rebuild message to a storage integrity processing unit that includes slice names associated with the latest revision requiring rebuilding and rebuilding all encoded data slices associated with the data segment to the latest revision by retrieving a decode threshold number of encoded data slices associated with the latest revision, dispersed storage error decoding the threshold number of encoded data slices to produce a set of encoded data slices, and sending the set of encoded data slices to the DS unit storage set for storage therein.

FIG. 13A is a diagram illustrating another example of a memory utilization map where a memory utilization of a memory device 1 is compared to a memory utilization of a memory device 2 for both an unbalanced state and a balanced state after a memory balancing function has been executed as described in greater detail with reference to FIG. 13B. In an implementation example, memory device 1 and memory device 2 are be implemented in a common dispersed storage (DS) unit. In another implementation example, memory device 1 and memory device 2 are implemented in two different DS units. The shaded area of the memory device utilization figure indicates a proportion of utilization relative to the capacity of the memory device. A memory mapping of unbalanced memory devices 270 indicates that memory device 2 is utilizing more of the capacity of memory device 2 as compared to the utilization of memory device 1 when the memory utilization is unbalanced.

The memory devices 1 and 2 may each be assigned to a slice address range corresponding to encoded data slices to be stored in the memory device (e.g., a slice name range). For example, memory device 1 is assigned to an address range of 125-136 and memory device 2 is assigned to an address range of 137-185 when the memory devices are unbalanced. In an example of operation, memory device 1 and memory device 2 are implemented in DS unit 5 wherein the DS unit 5 is utilized to store encoded data slices. DS unit 5 has stored more bytes of encoded data slices in memory device 2 as compared to bytes of encoded data slices stored in memory device 1 when the memory devices are unbalanced. In such a scenario, DS unit 5 may determine to execute a memory balancing function to balance the utilization of memory device 1 and memory device 2.

The memory utilization of memory device 1 and memory device 2 is balanced (e.g., approximately the same utilization) following the execution of the memory balancing function. Such a memory balancing function may result in the transfer of encoded data slices from memory device 2 to memory device 1 and the address range may be modified such that memory device 1 is assigned to an address range of 125-142 and memory device 2 is assigned to an address range of 143-185 when the memory devices are balanced as in the memory mapping of balanced memory devices 272. In such a scenario, some of the slice addresses were reassigned from an over utilized memory device to an underutilized memory device. The method of the memory balancing function is discussed in greater detail with reference to FIG. 13B.

FIG. 13B is a flowchart illustrating another example of balancing memory utilization. The method begins with step 274 where a processing module determines memory devices to consider balancing. Such memory devices may include one or more of a single memory device, an array of memory devices, a dispersed storage (DS) unit that includes a plurality of memory devices, a plurality of DS units within a dispersed storage network (DSN) memory, and a plurality of DSN memories. Such a determination may be based on one or more of where a balancing process left off last time, a query, an error message, a command, a predetermination, and a list.

The method continues at step 276 where the processing module determines utilization of the memory devices. Such utilization may indicate one or more of an amount of storage used, an amount of storage utilized as a percentage of a capacity of the memory device, an amount of storage utilized by a category (e.g., based on a priority indicator, a security indicator, a performance indicator, a user identifier (ID), a vault ID, an affiliated group, etc.), and an amount of unused available capacity. Such a utilization determination may be based on one or more of a query, and memory analysis, a list, a ping, a message, a command, an error message, and lookup.

The method continues at step 280 where the processing module determines whether to balance the utilization of the memory devices. Such a determination may be based on one or more of the memory devices, the utilization of the memory device, a difference in utilization of memory devices, a utilization difference threshold, a comparison of the difference in utilization of memory devices to the utilization difference threshold, an estimated impact to balance utilization of the memory devices, and one or more different groupings of two or more memory devices. For example, the processing module determines to balance when a difference in utilization of the memory devices is greater than a utilization difference threshold. The method branches to step 282 when the processing module determines to balance the utilization of the memory devices. The method repeats back to step 274 when the processing module determines not to balance the utilization of the memory devices. Note that the processing module may recursively determine different groupings of memory devices to determine a combination to balance (e.g., memories 1/2, memories 2/3, memories 1/3, etc.).

The method continues at step 282 where the processing module determines how to balance utilization of the memory devices. For example, the processing module may determine to move the slice name address boundary that splits an address range between the two or more memory devices and/or transfer encoded data slices from a memory device with a higher utilization to a memory device with a lower utilization followed by updating a virtual DSN address to physical location table. Such a determination may be based on one or more of the utilization of the memory devices, a capacity of the memory devices, an address range of assignments, size of the stored data slices, an estimation of a number of encoded data slices to transfer based on a size of the encoded slices to equalize memory device utilization, a predetermination, a lookup, a message, and a command.

The method continues at step 284 where the processing module transfers encoded data slices from a first memory device to a second memory device wherein the first memory device is more utilized in the second memory device. In addition, the processing module may delete or overwrite the encoded slices transferred from the first memory device when the processing module has confirmed that the encoded data slices were successfully transferred to the second memory device.

The method continues at step 286 where the processing module re-assigns slice address range assignments of the first memory device and the second memory device. Such reassigning includes assigning a portion of slice name address ranges previously utilized by the first memory device to be assigned to slice name address ranges of the second memory device. The processing module may repeat the method producing a cascade effect after moving a first block of slices from the first memory device to the second memory device. For example, the second memory element may appear over utilized by comparison to a third memory element after transferring encoded data slices from memory device 1 to memory device 2.

FIG. 14A is a flowchart illustrating an example of identifying a failed memory device. The method begins with step 288 where a processing module detects a failed memory device. Such a determination may be based on one or more of a query, an error message, a failed transaction indicator, a memory device removal indicator, a message, and a command. The method continues at step 290 where the processing module determines a dispersed storage network (DSN) address range associated with the failed memory device. Such a determination may be based on one or more of a virtual DSN address to physical location table lookup, a query, a message, and a command. The method continues at step 292 where the processing module sends the DSN address range of the failed memory device to one or more of a dispersed storage (DS) processing unit, a DS managing unit, a storage integrity processing unit, a user device, and a DS unit. Such sending of the DSN address range may invoke a memory device access restriction method as described in greater detail with reference to FIG. 14B.

FIG. 14B is a flowchart illustrating an example of processing a memory access request. The method begins with step 294 where a processing module receives a dispersed storage network (DSN) memory access request. Such a request may include one or more of a user identifier (ID), a data object name, a priority indicator, a security indicator, a performance indicator, access requirements, metadata, and an access command. Note that the access command may include one of but not limited to a store command, a retrieve command, a delete command, and a list command.

The method continues at step 296 where the processing module determines required DSN address ranges for a plurality of sets of encoded data slices corresponding to the DSN memory access request. Such a determination may be based on one or more of a data object name, a user ID, a vault ID, a vault lookup, a virtual DSN address to physical location table lookup, a source name determination, a slice name determination, a predetermination, a message, and a command. For example, the processing module determines a source name based on the data object name and a vault ID and determines a plurality of slice names corresponding to the source name. Next, the processing module determines the required DSN address ranges based on a virtual DSN address to physical location table lookup utilizing the plurality of slice names as an index.

The method continues at step 298 where the processing module determines failed memory devices corresponding to the required DSN address ranges. Such a determination may be based on one or more of a failed address range list, a received DSN address range of a failed memory device, the required DSN address range, a query, a message, and a command. For example, the processing module receives one or more messages indicating a DSN address range of one or more failed memory devices. The processing module aggregates the messages into a failed address range list and utilizes the list to determine the failed memory devices of the required DSN address ranges by comparing the addresses of a list to the required DSN address ranges.

The method continues at step 300 where the processing module determines whether too many memory devices have failed of the required DSN address ranges by comparing a number of failed memory devices of the required DSN address ranges to a failure threshold. For example, the processing module determines that too many memory devices have failed of the required DSN address ranges when the number of failed memory devices of the required DSN address ranges is greater than the failure threshold. The method branches to step 304 when the processing module determines that too many memory devices have not failed. The method continues to step 302 when the processing module determines that too many memory devices have failed. The method continues at step 302 where the processing module rejects the request. Such rejecting includes sending a reject message to a requester and/or to a dispersed storage (DS) managing unit.

The method continues at step 304 where the processing module processes the DSN memory access request when the processing module determines that too many memory devices have not failed. Such a method may provide computing system network utilization efficiency improvement since data slice retrievals will not be attempted when there are too many memory device failures.

Figure 15:
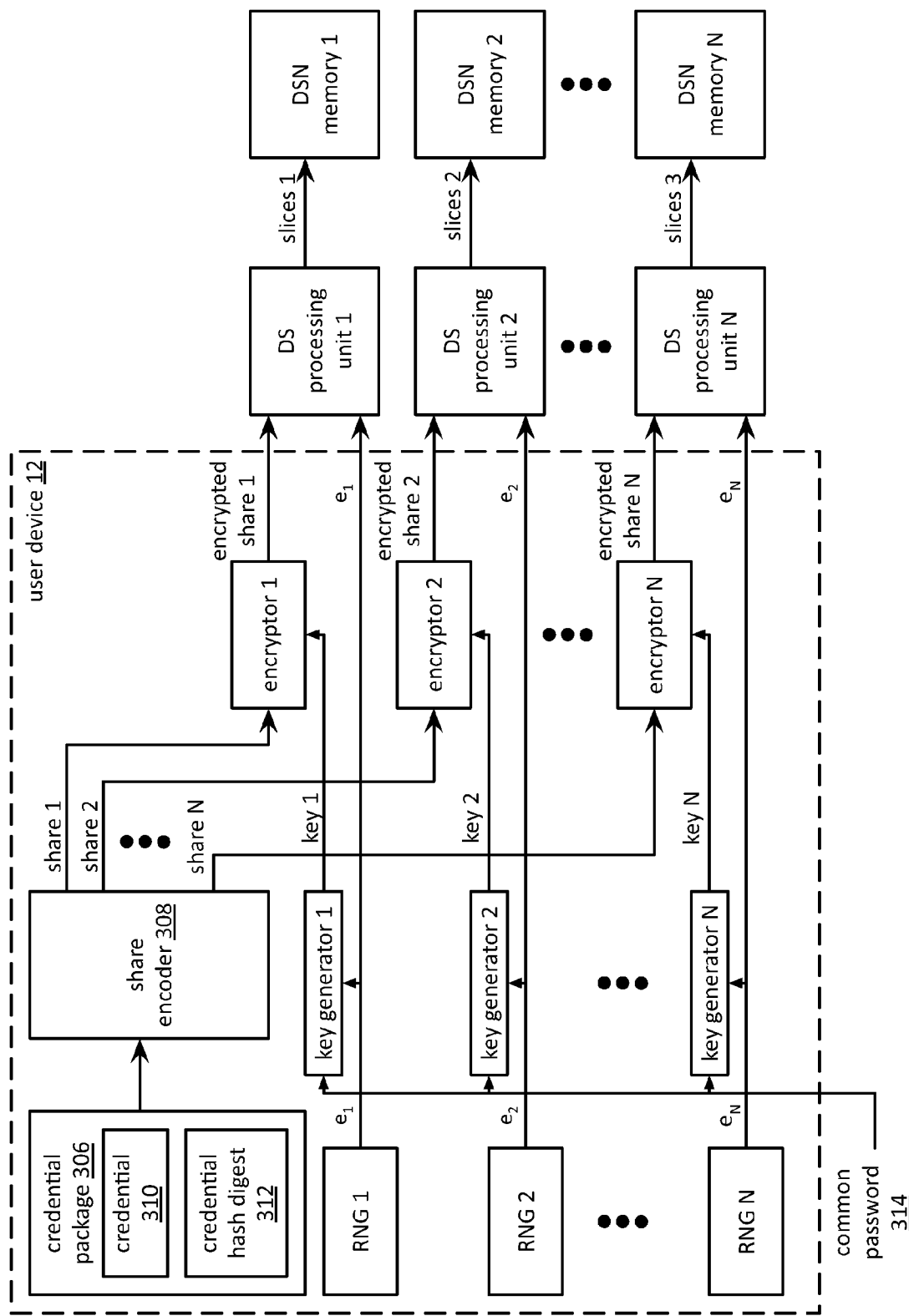
FIG. 15 is another schematic block diagram of an embodiment of a computing system in accordance with the invention.

FIG. 15 is another schematic block diagram of an embodiment of a computing system that includes a user device 12, at least one dispersed storage (DS) processing unit 16 of a plurality of DS processing units 1-N, and at least one dispersed storage network (DSN) memory 22 of a plurality of DSN memories 1-N. For example, as illustrated, the computing system may include N DS processing units 1-N and N DSN memories 1-N. As another example, the computing system may include one DS processing unit and N DSN memories. As yet another example, the computing system may include N DS processing units 1-N and one DSN memory. Each DS processing unit 1-N may be implemented utilizing an authentication server.

Such a user device 12 includes a credential package 306, a share encoder 308, a plurality of random number generators (RNG) 1-N, a plurality of key generators 1-N, and a plurality of encryptors 1-N. Such a credential package 306 may include a credential 310 and a credential hash digest 312. Such a credential 310 may include sensitive data including one or more of a private key, a public key, a signed certificate, confidential user information, a password, and any sensitive confidential information. Such a credential hash digest 312 may be generated by utilizing a hash function on the credential 310. Such a credential hash digest 312 may be utilized in a subsequent integrity verification step to verify that the credential 310 has not been tampered with.

Such a share encoder 308 encodes the credential package 306 to produce encoded shares 1-N in accordance with a share encoding function (e.g., Shamir secret sharing algorithm). Such encryptors 1-N encrypt the encoded shares 1-N in accordance with an encryption algorithm utilizing keys 1-N to produce encrypted shares 1-N. Generation of the keys 1-N is discussed in greater detail below. Such an encryption algorithm may be in accordance with dispersed storage error coding parameters associated with the user device 12. For example, each of the encryptors 1-N utilize a common encryption algorithm in accordance with the dispersed storage error coding parameters. As another example, at least two encryptors of the encryptors 1-N utilize different encryption algorithms in accordance with the dispersed storage error coding parameters.

The encryptors 1-N output the encrypted shares 1-N to the DS processing units 1-N. The DS processing units 1-N dispersed storage error encodes each encrypted share of the encrypted shares 1-N to produce N groups of encoded share slices in accordance with the error coding dispersal storage function parameters, wherein each group of encoded share slices includes one or more sets of encoded data slices. The DS processing units 1-N send the N groups of encoded share slices to the DSN memories 1-N for storage therein. Alternatively, the functionality of the DS processing unit (e.g., DS processing 34) may be included in the user device 12 such that the user device 12 dispersed storage error encodes the encrypted shares 1-N to produce the N groups of encoded share slices. Next, the user device 12 sends the N groups of encoded share slices to the DSN memories 1-N for storage therein. Alternatively, the encryptors 1-N output the encrypted shares 1-N to one or more of the DSN memories 1-N for storage therein (e.g., without producing N groups of encoded share slices). Alternatively, the DS processing units 1-N send the encrypted shares 1-N to the one or more of the DSN memories 1-N for storage therein.

Such random number generators 1-N generate a plurality of random numbers $e_1$-$e_N$. For example, random numbers $e_1$-$e_N$ are each a same number of bits as a number of bits of p, where p is determined by security parameters (e.g., of the dispersed storage error coding parameters). The random number generators 1-N output the plurality of random numbers $e_1$-$e_N$ to the DS processing units 1-N. The DS processing units 1-N dispersed storage error encodes each random number of the plurality of random numbers in accordance with the dispersed storage error coding parameters to produce N groups of encoded random number slices, wherein each group of encoded random number slices includes at least one set of random number slices. Next, the DS processing units 1 send the groups of encoded random number slices to the DSN memories 1-N for storage therein. Alternatively, the user device 12 dispersed storage error encodes the plurality of random numbers to produce the N groups of encoded random number slices. Next, the user device 12 sends the N groups of encoded random number slices to the DSN memories 1-N for storage therein. Alternatively, the user device 12 sends the plurality of random numbers $e_1$-$e_N$ to the one or more of the DSN memories 1-N for storage therein.

Such key generators 1-N generate the keys 1-N based on one or more of the plurality of random numbers $e_1$-$e_N$, the security parameters, and a common password 314. Such a common password may be utilized from time to time by a user of the user device 12 to gain access to services, information, and/or functions provided by the user device. Such a common password may be obtained by one or more of receiving a user input, a retrieval, received from a flash memory device, and receiving the message. For example, the user device 12 receives a user input of ten alphanumeric characters via a user interface input.

Such generation of the keys 1-N based on the security parameters produces each key of the keys 1-N such that each key includes a same number of bits as a number of bits of p. For example, the key generators 1-N generate the keys 1-N by transforming an expansion of the common password utilizing a mask generating function (MGF) and the plurality of random numbers in accordance with an expression key x=((MGF (common password))$^2$)$^{e_x}$ modulo p. For instance, key generator 1 generates key 1=((MGF(password))$^2$)$^{e_1}$ modulo p. Such a MGF produces a deterministic pattern of bits of any desired length based on an input. For instance, the generator 1 calculates key 1=13 when MGF(common password)=4, $e_1$=10, and p=23, as $(4^2)^{10}$ mod 23=13. Alternatively, or in addition to, the key may be further processed to provide a key of a desired length in relation to an encryption algorithm. For example, the key output of the algorithm is hashed to produce a hashed key and a desired number of bits (e.g., 256, 192, 128 bits) of the hashed key are utilized as a key for the encryption algorithm.

The common password 314 and a decode threshold number of pairs of stored random numbers and encrypted shares are required to reproduce the credential package. Note that a security improvement is provided by the system when the pairs of stored random numbers and encrypted shares are stored on substantially different authentication servers and/or via two or more DS processing units and two or more DSN memories since a likelihood of a successful attack to gain access to the pairs of stored random numbers and encrypted shares is reduced. The reproduction of the credential package is discussed in greater detail with reference to FIGS. 17-19. The method of operation to store the credential package is discussed in greater detail with reference to FIG. 16.

Figure 16:
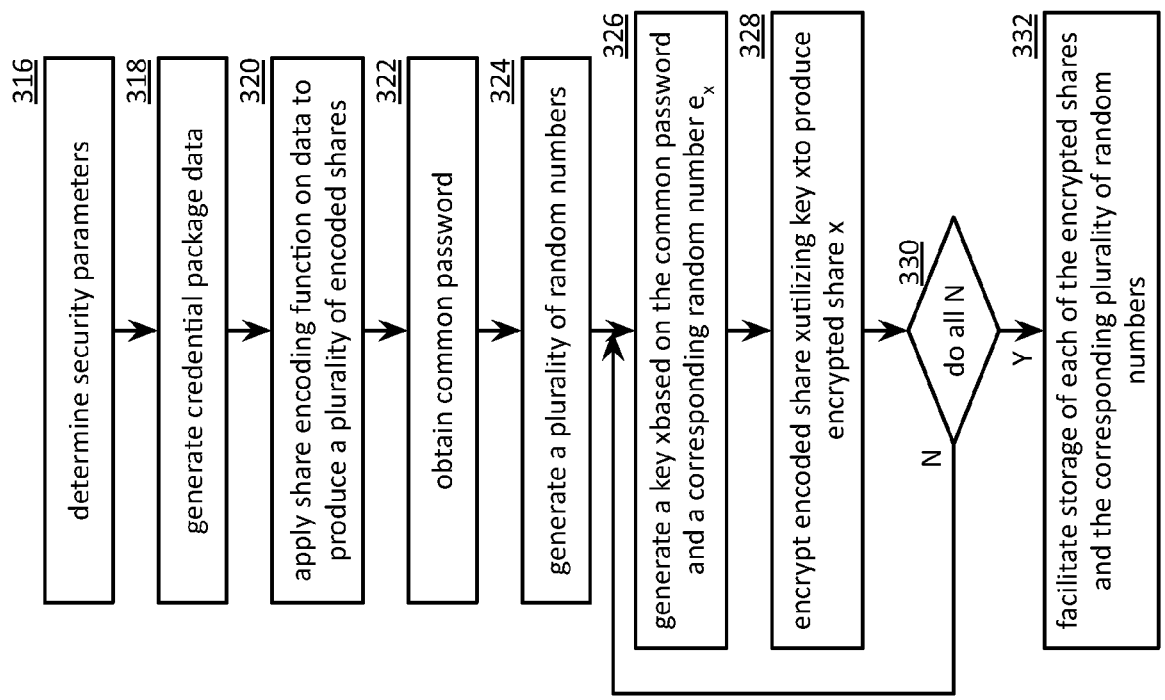
FIG. 16 is a flowchart illustrating an example of storing data in accordance with the invention.

FIG. 16 is a flowchart illustrating an example of storing data. The method begins with step 316 where a processing module determines security parameters to be utilized in the storing of sensitive data (e.g., a credential package). Such security parameters may include one or more of a share number N, a value of security algorithm constant p (e.g., a prime number), a value of security algorithm constant q (e.g., a prime number), shared secret algorithm parameters, an encryption algorithm indicator, a key generator function indicator, a key size, a random number generator function, a random number size, a hash function type indicator, a security package structure indicator, and any other parameter to specify the operation of the storing of the sensitive data. Such a determination of the security parameters may be based on one or more of security requirements, a security status indicator, a user identifier (ID), a vault ID, a list, a table lookup, a predetermination, a message, and a command. For example, the processing module determines the security parameters based on a table lookup corresponding to a user ID affiliated with a user device.

The method continues at step 318 where the processing module generates the sensitive data in accordance with the security parameters. For example, the processing module generates the sensitive data to include a credential and a credential hash digest. For example, the processing module generates a hash digest of a private key and bundles the hash digest with the private key to create a credential package as the sensitive data.

The method continues at step 320 where the processing module applies a share encoding function on the data (e.g., the credential package) to produce a plurality of encoded shares. Such a share encoding function includes at least one of a dispersed storage error encoding function and a secret sharing function. Such a secret sharing function includes at least one of Shamir's secret sharing scheme, Blakely's scheme, and a Chinese Remainder Theorem scheme. For example, the processing module produces encoded shares 1-16 in accordance with shared secret algorithm parameters when N=16 and the share encoding function includes the secret sharing function. As another example, the processing module dispersed storage error encodes the data in accordance with dispersed storage error coding parameters to produce encoded shares 1-N when the share encoding function includes the dispersed storage error coding function.

The method continues at step 322 where the processing module obtains a common password. Such obtaining may be based on one or more of a user input, a dispersed storage (DS) managing unit input, a query, a prompt, a retrieval from a memory storage device, an algorithm, a lookup, a message, and a command. For example, the processing module obtains a 10 character common password via an input user interface.

The method continues at step 324 where the processing module generates a corresponding plurality of random numbers for the plurality of encoded shares. Such generating of the corresponding plurality of random numbers includes obtaining (e.g., generate, receive in a message, retrieve from a random number generator) a plurality of base random numbers and expanding each base random number of the plurality of base random numbers based on the security parameters to produce the corresponding plurality of random numbers. For example, processing module expands the base set of random numbers such that each random number of the corresponding plurality of random numbers is 1,024 bits in length (e.g., p is 1,024 bits in length).

The method continues at step 326 where the processing module generates an encryption key for each encoded share of the plurality of encoded shares based on the common password and a corresponding one of the corresponding plurality of random numbers. Such generating of the encryption key includes transforming the common password utilizing a mask generating function, the security parameters, and the corresponding one of the corresponding plurality of random numbers. For example, the processing module generates a key x based on the common password and the corresponding random number $e_x$ in accordance with the expression key $x = ((MGF(\text{common password}))^2)^{e_x}$ modulo p.

The method continues at step 328 where the processing module encrypts the encoded share utilizing the encryption key to produce an encrypted share. Such encryption may be based on one or more of the security parameters, the dispersed storage error coding parameters, a user identifier (ID), a vault ID, a vault lookup, security requirements, a security status indicator, a message, and a command.

The method continues at step 330 where the processing module determines if all N of the encoded shares 1-N have been encrypted. Such a determination may be based on comparing a number of encrypted shares produced so far to the value of N. The method repeats back to step 326 when the processing module determines that all N encrypted shares have not been produced. The method continues to step 332 when the processing module determines that all N encrypted shares have been produced.

The method continues at step 332 where the processing module facilitates storage of the corresponding plurality of random numbers and each of the encrypted shares. Such facilitating includes at least one of sending the encrypted share and the corresponding one of the corresponding plurality of random numbers to a dispersed storage (DS) processing unit, dispersed storage error encoding the encrypted share to produce a plurality of encoded share slices and outputting the plurality of encoded share slices for storage (e.g., send to a dispersed storage network memory), and dispersed storage error encoding the corresponding one of the corresponding plurality of random numbers to produce a plurality of encoded random number slices and outputting the plurality of encoded random number slices for storage (e.g., send to a dispersed storage network memory).

Figure 17:
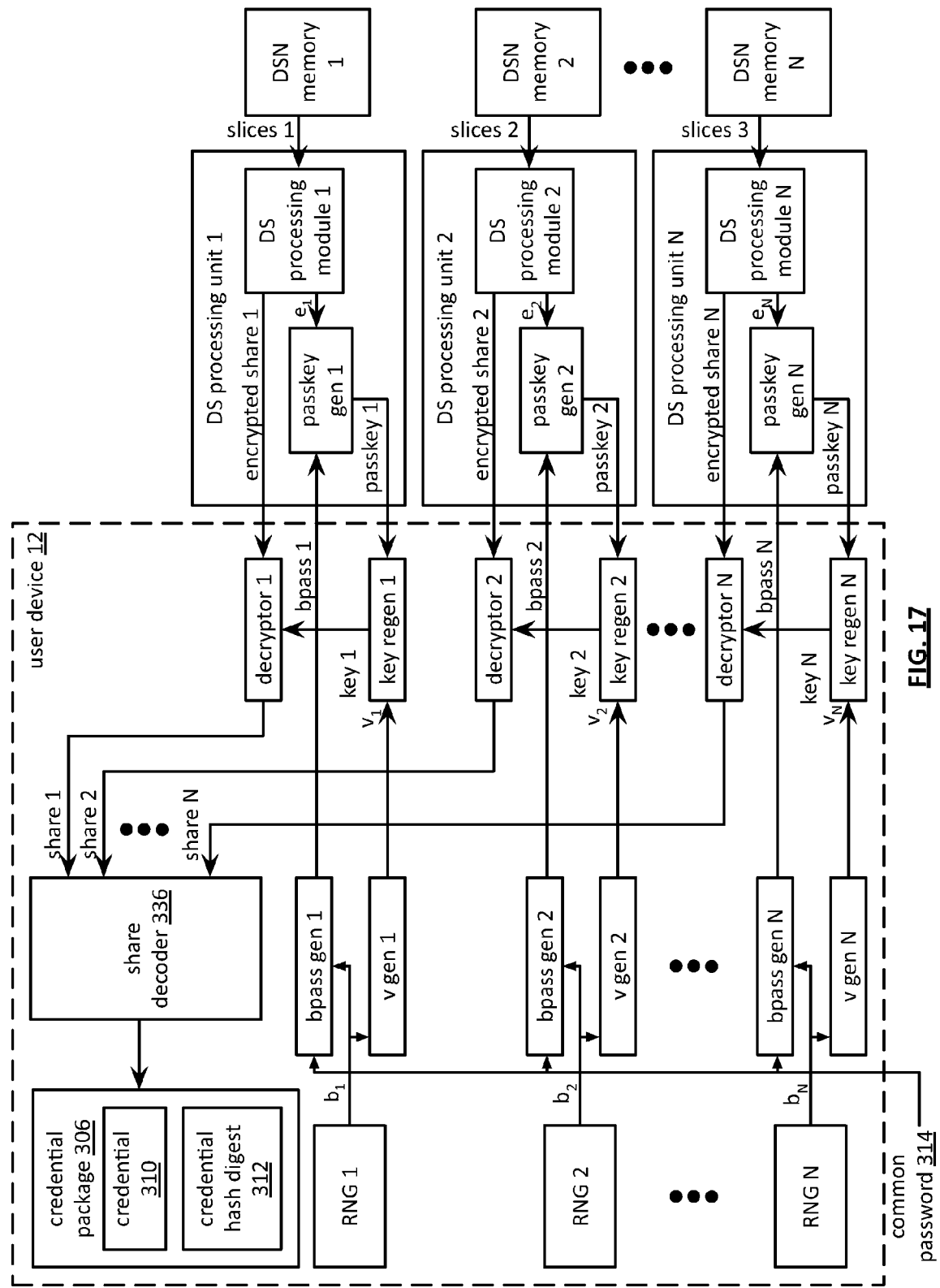
FIG. 17 is another schematic block diagram of an embodiment of a computing system in accordance with the invention.

FIG. 17 is another schematic block diagram of an embodiment of a computing system that includes a user device 12, at least one dispersed storage (DS) processing unit 16 of a plurality of DS processing units 1-N, and at least one dispersed storage network (DSN) memory 22 of a plurality of DSN memories 1-N. For example, as illustrated, the computing system may include N DS processing units 1-N and N DSN memories 1-N. As another example, the computing system may include one DS processing unit and N DSN memories. As yet another example, the computing system may include N DS processing units 1-N and one DSN memory. Each DS processing unit 1-N may be implemented utilizing one or more of a DS processing unit 16 of FIG. 1, a web server, a DS unit, and an authentication server.

Such a user device 12 includes a credential package 306, a share decoder 336, a plurality of random number generators (RNG) 1-N, a plurality of blinded password generators 1-N, a plurality of value generators 1-N, a plurality of key regenerators 1-N, and a plurality of decryptors 1-N. Such a credential package 306 may include a credential 310 and a credential hash digest 312. Such a DS processing unit of the DS processing units 1-N includes a DS processing module and a passkey generator. For example, DS processing units 1-N each include a DS processing module of DS processing modules 1-N and a passkey generator of passkey generators 1-N. Alternatively, the user device 12 includes the functionality of the DS processing units 1-N.

Such random number generators 1-N generate blinded random numbers $b_1$-$b_N$. For example, each random number generator of the random number generators 1-N generates a blinded random number of the blinded random numbers $b_1$-$b_N$ such that each blinded random number includes a same number of bits as a number of bits of p, wherein p is extracted from dispersed storage error coding parameters and/or security parameters. The random number generators 1-N send the blinded random numbers $b_1$-$b_N$ to the blinded password generators 1-N and to the value generators 1-N.

Such blinded password generators 1-N generate blinded passwords 1-N (e.g., bpass 1-N) based on the blinded random numbers $b_1$-$b_N$, a common password 314, and security parameters. Such generation includes transforming an expansion of the common password utilizing a mask generating function (MGF) and a corresponding one of the blinded random numbers $b_1$-$b_N$ in accordance with the expression bpass $x = ((MGF(\text{common password}))_2)^{b_x}$ modulo p. For example, bpass $1 = ((MGF(\text{common password}))^2)^{b_1}$ modulo p. In an instance, the blinded password generator 1 calculates bpass 1=18 when MGF(common password)=4, $b_1$=7, and p=23, since $(4^2)^7 \mod 23 = 18$. The blinded password generators 1-N send the blinded passwords 1-N to the passkey generators 1-N.

Such value generators 1-N generate values $v_1$-$v_N$ based on the blinded passwords $b_1$-$b_N$ and the value of a security parameter constant q of the security parameters in accordance with the expression b*v modulo q=1. Such a security parameter constant q may be based on the value of p in accordance with the expression q=(p-1)/2. For instance, q=11 when p=23. In an example of generating a value, value generator 1 generates a value v1=8 when $b_1$=7 and q=11 (e.g., 7*8=56; 56 modulo 11=1). The value generators 1-N send the values $v_1$-$v_N$ to the key regenerators 1-N.

Such passkey generators 1-N may retrieve stored random number values of $e_1$-$e_N$ from the DS processing modules 1-N in response to receiving a retrieve credential package request from the user device 12. For example, a DS processing module of the DS processing modules 1-N retrieves at least a dispersal decode threshold number of encoded stored random number slices from one or more DSN memories 1-N, dispersed storage error decodes the at least the dispersal decode threshold number of encoded stored random number slices to produce a stored random number of the stored random numbers $e_1$-$e_N$, and sends the stored random number to a corresponding passkey generator of the passkey generators 1-N.

Such passkey generators 1-N generate passkeys 1-N based on the stored random numbers $e_1$-$e_N$ and the blinded passwords 1-N in accordance with the expression passkey x=(bpass x)$^e_x$ modulo p. For instance, passkey generator 1 generates a passkey 1=9 when bpass 1=18, $e_1$=10, and p=23 (e.g., since $(18)^{10}$ modulo 23=9). The passkey generators 1-N send the passkeys 1-N to the key regenerators 1-N. Such key regenerators 1-N regenerate keys 1-N based on the passkeys 1-N and the values $v_1$-$v_N$ in accordance with the expression key x=(passkey x)$^v_x$ modulo p. For instance, key regenerator 1 regenerates key 1 such that key 1=13 when passkey 1=9, v1=8, and p=23 (e.g., since $(9)^8$ modulo 23=13). The key regenerators 1-N send keys 1-N to the decryptors 1-N.

Such a DS processing module of the DS processing modules 1-N retrieves (e.g., from one or more of the DSN memories 1-N) and dispersed storage error decodes at least a dispersal decode threshold number of encoded encrypted share slices to produce an encrypted share of encrypted shares 1-N in response to a retrieval request received from the user device 12. The DS processing modules 1-N send the encrypted shares 1-N to the decryptors 1-N. The decryptors 1-N decrypt the encrypted shares 1-N utilizing keys 1-N in accordance with a decryption algorithm to produce shares 1-N. Such a decryption algorithm may be in accordance with the dispersed storage error coding parameters and/or the security parameters. For example, each of the decryptors 1-N utilize a common decryption algorithm in accordance with security parameters. As another example, at least two of the decryptors 1-N utilize a different decryption algorithm in accordance with the security parameters. The decryptors 1-N send the shares 1-N to the share decoder 336.

Such a secret share decoder 336 decodes the shares 1-N to reproduce the credential package 306. Such decoding may include at least one of dispersed storage error decoding the shares 1-N to reproduce the data and decoding the set of shares utilizing a secret sharing function to reproduce the data. For example, the share decoder 336 decodes the set of shares utilizing a Shamir secret sharing algorithm. The method to retrieve such a securely stored credential package is discussed in greater detail with reference to FIGS. 18-19.

Figure 18:
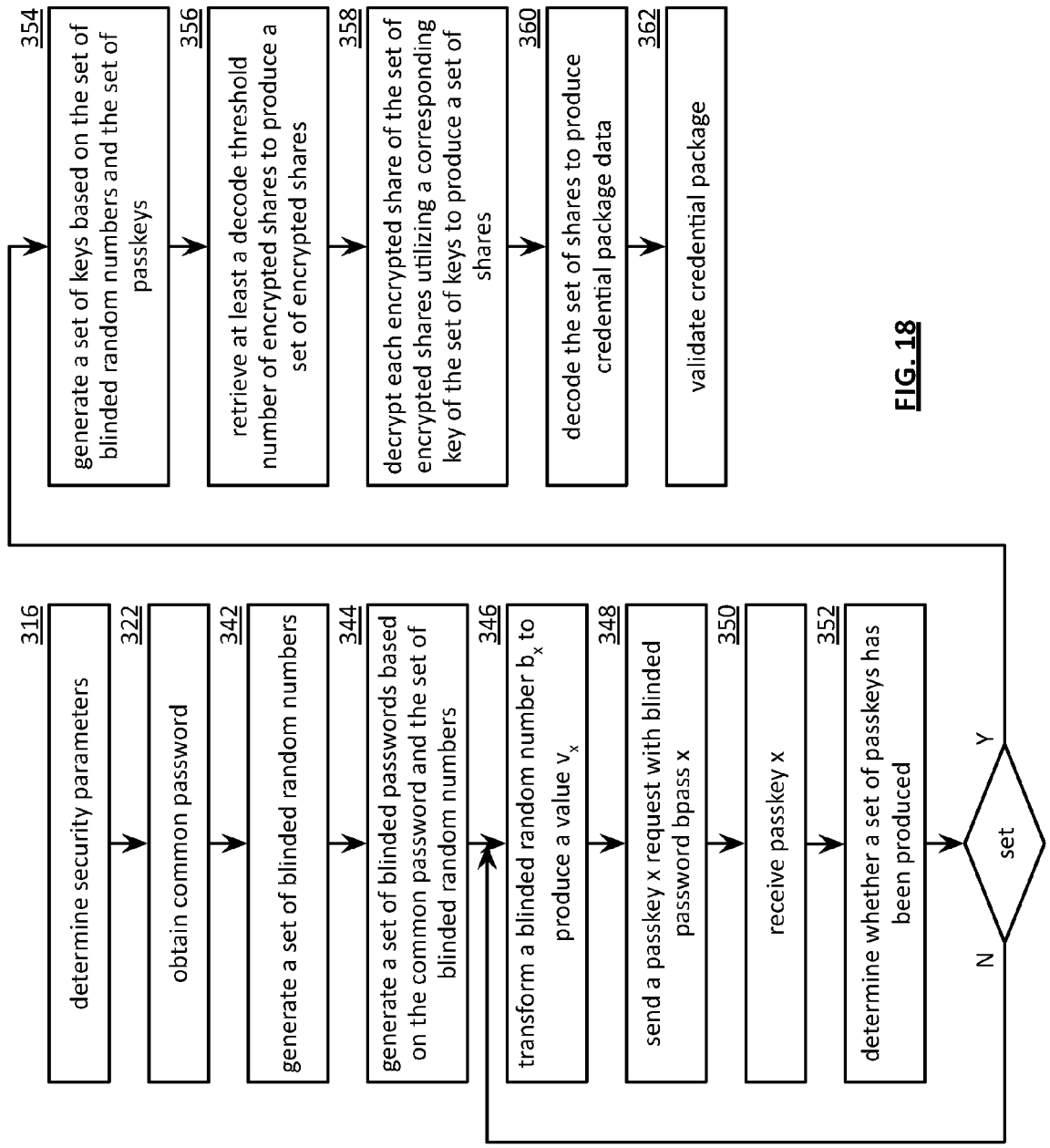
FIG. 18 is a flowchart illustrating another example of retrieving data in accordance with the invention.

FIG. 18 is a flowchart illustrating another example of retrieving data that include similar steps of FIG. 16. The method begins with steps 316 and 322 of FIG. 16 where a processing module determines security parameters and obtains a common password. The method continues at step 342 where the processing module generates a set of blinded random numbers. Such generating includes obtaining a set of base random numbers (e.g., generate, receive in a message, retrieve from a random number generator) and expanding each base random number of the set of base random numbers based on security parameters to produce the set of blinded random numbers. For example, the processing module generates a set of base random numbers and expands each base random number of the set of base random numbers in accordance with a security constant p of the security parameters to produce a set of blinded random numbers such that each blinded random number includes a same number of bits as a number of bits of p.

The method continues at step 344 where the processing module generates a set of blinded passwords based on a common password and the set of blinded random numbers. Such generating of the set of blinded passwords includes, for each blinded random number of the set of blinded random numbers, transforming the common password utilizing a mask generating function and the blinded random number to produce a blinded password of the set of blinded passwords. For example, the processing module generates a blinded password x of the set of blinded passwords based on the common password and a corresponding blinded random number $b_x$ in accordance with the expression blinded password x=((MGF (common password))$^2$)$^{b_x}$ modulo p.

The method continues at step 346 where the processing module transforms the blinded random number utilizing a modulo function based on the security parameters to produce a value of a set of values for each blinded random number of the set of blinded random numbers. For example, the processing module generates a value $v_x$ of the set of values based on a blinded random number $b_x$ in accordance with the expression b*v modulo q=1, wherein q is a security constant of the security perimeters such that q=(p-1)/2. For instance, v=b^(q-2) mod q, when q is prime (e.g., 8=7^9 mod 11, 8*7 mod 11=1).

The method continues at step 348 where the processing module sends a passkey x request that includes the blinded password x to a dispersed storage (DS) processing module x (e.g., of a DS processing unit, a DS unit, a web server, an authentication server). The method continues at step 350 where the processing module receives a passkey x from the DS processing module x in response to the passkey x request. The method of operation of the DS processing module x is discussed in greater detail with reference to FIG. 19. Alternatively, the processing module functions in accordance with the method of the DS processing module x to produce the passkey x.

The method continues at step 352 where the processing module determines whether the set of passkeys has been produced, wherein the set of passkeys includes at least a share function decode threshold number of passkeys. The method repeats back to step 346 when the processing module determines that the set of passkeys has not been produced. The method continues to step 354 when the processing module determines that the set of passkeys has been produced.

The method continues at step 354 where the processing module generates a set of decryption keys based on the set of values (e.g., generated based on the set of blinded random numbers) and the set of passkeys. Such generating includes transforming each passkey of the set of passkeys utilizing a modulo function based on security parameters and a corresponding value of the set of values to produce a decryption key of the set of decryption keys. For example, the processing module generates key x based on the value $v_x$ and passkey x in accordance with the expression key x=(passkey x)$^{v_x}$ modulo p.

The method continues at step 356 where the processing module retrieves at least a decode threshold number of encrypted shares to produce a set of encrypted shares, wherein the set of encrypted shares corresponds to the set of stored random numbers. Such retrieving includes at least one of outputting at least one encrypted share retrieval request message to at least one DS processing to retrieve the at least the decode threshold number of encrypted shares from a dispersed storage network (DSN) memory and for each encrypted share of the set of encrypted shares, retrieving a set of encoded encrypted share slices from the DSN memory and dispersed storage error decoding the set of encoded encrypted share slices to produce the encrypted share.

The method continues at step 358 where the processing module decrypts each encrypted share of the set of encrypted shares utilizing a corresponding decryption key of the set of decryption keys to produce a set of shares. Such decrypting may be in accordance with a decryption algorithm based on one or more of the security parameters, error coding dispersal storage function parameters, a user identifier (ID), a vault ID, a vault lookup, security requirements, a security status indicator, a message, and a command.

The method continues at step 360 where the processing module decodes the set of shares to reproduce data. Such decoding includes at least one of dispersed storage error decoding the set of shares to produce the data and decoding the set of shares utilizing a secret sharing function to produce the data (e.g., a credential package).

The method continues at step 362 where the processing module validates the data when the data is a credential package. Such validating includes comparing a calculated hash of a credential of the credential package to a credential hash digest of the credential package. For example, the processing module determines that the credential package is valid when the comparison indicates that the calculated hash of the credential is substantially the same as the credential hash digest.

Figure 19:
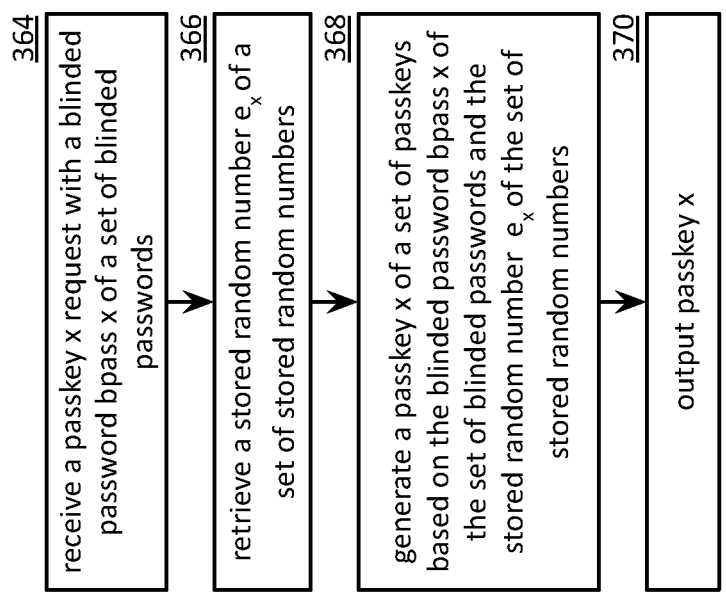
FIG. 19 is a flowchart illustrating an example of generating a passkey in accordance with invention.

FIG. 19 is a flowchart illustrating an example of generating a passkey. The method begins with step 364 where the processing module receives a passkey x request, wherein the request includes a blinded password x of a set of blinded passwords. Alternatively, the processing module receives the set of blinded passwords. Such a passkey x request may include a passkey x identifier, the blinded password x, a user identifier (ID), a vault ID, a source name, one or more slice names, and a random number identifier (e.g., a data object name, a block number, a source name, a directory identifier, etc.). For example, the processing module receives the passkey x request from a user device, wherein the request includes the blinded password x and a data object name affiliated with a desired random number $e_x$.

The method continues at step 366 where the processing module retrieves at least a decode threshold number of stored random numbers to produce a set of stored random numbers. Such retrieving includes at least one of outputting at least one stored random number retrieval request message to at least one dispersed storage (DS) processing unit to retrieve the at least the decode threshold number of stored random numbers from a dispersed storage network (DSN) memory, for each stored random number of the set of stored random numbers retrieving a set of encoded stored random number slices from the DSN memory, and dispersed storage error decoding the set of encoded stored random number slices to produce the stored random number. For example, the processing module retrieves a set of encoded stored random number slices corresponding to a received data object name affiliated with the desired random number $e_x$ and dispersed storage error decodes the set of encoded stored random number slices to produce stored random number $e_x$.

The method continues at step 368 where the processing module generates a set of passkeys based on the set of blinded passwords and the set of stored random numbers. Such generation includes transforming the blinded password utilizing a modulo function based on a corresponding stored random number of the set of stored random numbers and security parameters to produce a passkey of the set of passkeys for each blinded password of the set of blinded passwords and outputting the set of blinded passwords to a DS processing unit and receiving the set of passkeys. For example, the processing module generates a passkey x based on stored random number $e_x$ and blinded password x in accordance with an expression passkey x=(blinded password x)$^{e_x}$ modulo p. The method continues at step 370 where the processing module outputs the passkey x (e.g., to a requester).

The methods described above operate in accordance with the mathematical expressions described in the methods above to enable generation of keys utilized to encrypt and decrypt shares of a credential package. The mathematical expressions may be further understood in consideration of the following mathematical proof, wherein the proof illustrates that a reproduced key (e.g., to decrypt an encrypted share) is substantially equivalent to an original key (e.g., utilized to encrypt the share).

Proof—Recall that:

$$b*v=1 \bmod q \text{ and } p=2*q+1$$

Will show that:

$$(MGF(password)^2)^{(b*e*v)} \text{ equals } (MGF(password)^2)^e (\text{modulo } p)$$

Replace MGF(password) with X:

$$(X^2)^{(b*e*v)}=(X^2)^{(e)} (\text{modulo } p)$$

Note:

Since $b*v=1 \bmod q$, it follows that: $b*v=n*q+1$, for some integer n. Note that $(b*v)/q=n$ remainder 1.

Therefore (b*v) can be substituted with (n*q+1) in the above expression yielding:

$$(X^2)^{((n*q+1)*e)} \bmod p$$

Since p=2*q+1, take p out of the formula, giving:

$$(X^2)^{((n*q+1)*e)} \bmod (2*q+1)$$

Since $X^2$ is raised to a power, simply take X to the power of twice the exponent:

$$X^{(2*(nq+1)*e)} \bmod (2q+1)$$

Which may be written as:

$$X^{((2nq+2)*e)} \bmod (2q+1)$$

Multiplying both parts by e:

$$X^{(2nqe+2e)} \bmod (2q+1)$$

Split these out as so:

$$X^{(2neq)}*X^{(2e)} \bmod (2q+1)$$

Re-write the first power of X:

$$X^{(2q*ne)}*X^{(2e)} \bmod (2q+1)$$

Which can also be written as:

$$(X^{(2q)})^{(ne)}*X^{(2e)} \bmod (2q+1)$$

Un-doing the substitution of p for 2q+1, find:

$$(X^{(p-1)})^{(ne)}*X^{(2e)} \bmod p$$

Fermat's Little Theorem shows that for any prime number P, and any integer X, that:

$X^{(P-1)}=1 \mod P$, therefore $(X^{(p-1)}) \mod p = 1 \mod p$. This yields:

$1^{(ne)} * X^{(2e)} \mod p$

Which is the same as:

$1 * X^{(2e)} \mod p$

Which is:

$(X^2)^e \mod p$

Which is the key.
As a numerical example:
p=23
q=(p−1)/2=11
let e1=10
let [mask generating function (common password)]^2=16
key 1=16^e1 mod 23=13
let b1=7
bpass 1=16^7 mod 23=18
passkey 1=bpass^e1 mod p=18^10 mod 23=9
b*v=1 modulo q
b1*v1=1 mod q
7*v1=1 mod 11 note: 56 mod 11=1 so v1=8
regen key 1=passkey1^v1 modulo p
9^8 mod 23=13, which checks with the 13 calculated above for key 1.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a processing module of a storage unit, the method comprises:
   determining whether a memory device of a dispersed storage (DS) unit is unavailable to produce an unavailable memory device, wherein the DS unit is one of a plurality of DS units of a dispersed storage network (DSN), wherein a data object is dispersed storage error encoding into a plurality of sets of encoded data slices, and wherein the DS unit stores an encoded data slice from at least some sets of the plurality of sets of encoded data slices to produce stored encoded data slices;
   when the memory device is unavailable and when the memory device is storing one or more of the stored encoded data slices, determining a methodology regarding the one or more encoded data slices based on one or more DSN conditions to produce a determined methodology;
   when the determined methodology includes a rebuilding component, initiating, in accordance with the determined methodology, a rebuilding function to rebuild the one or more encoded data slices to produce rebuilt one or more encoded data slices, wherein the rebuilding function includes obtaining a decode threshold number of encoded data slices for the at least some sets of the plurality of sets of encoded data slices from other DS units of the plurality of DS units; and storing the rebuilt one or more encoded data slices within available memory of the DS unit.

2. The method of claim 1, wherein the one or more DSN conditions comprises at least one of:
 decode threshold and pillar width ratio;
 number of DS units in vault that are unavailable;
 network traffic; and
 priority level of the DS encoded data.

3. The method of claim 1 further comprises:
 when the determined methodology includes waiting for the memory device to become available, waiting for the memory device to become available; and
 when the memory device becomes available, changing status of the memory device from unavailable to available.

4. The method of claim 1 further comprises, when the determined methodology includes the rebuilding component:
 establishing a time period based on the one or more DSN conditions; and
 when the time period expires, reassigning a slice name range associated with the unavailable memory device to the available memory of the DS unit prior to the storing the rebuilt one or more encoded data slices.

5. The method of claim 4 further comprises:
 when the time period expires, initiating the rebuilding function.

6. The method of claim 1 further comprises, when the determined methodology includes the rebuilding component:
 determining that the DS unit includes a hot-standby memory device;
 when the DS unit includes the hot-standby memory device, determining, in accordance with the determined methodology, whether to use the hot-standby memory device, wherein the available memory of the DS unit includes the hot-standby memory device; and
 when the hot-standby memory device is to be used, reassigning a slice name range associated with the unavailable memory device to the hot-standby memory device prior to the storing the rebuilt one or more encoded data slices.

7. The method of claim 1 further comprises:
 determining whether to transfer the rebuilt one or more encoded data slices from the available memory of the DS unit to an additional memory of the DS unit;
 when the rebuilt one or more encoded data slices is to be transferred from the available memory of the DS unit to the additional memory, reassigning a slice name range associated with the available memory of the DS unit to the additional memory; and
 transferring the rebuilt one or more encoded data slices from the available memory of the DS unit to the additional memory.

8. The method of claim 1, wherein the storing the rebuilt one or more encoded data slices further comprises:
 reassigning a slice name range of the unavailable memory device to the available memory of the DS unit, wherein the reassigning the slice name range includes at least one of:
  updating the slice name range in a memory device table from the unavailable memory device to the available memory of the DS unit;
  when the available memory of the DS unit includes a plurality of memory devices:
   partitioning the slice name range into a plurality of slice name range partitions; and
   assigning one of the plurality of slice name range partitions to one of the plurality of memory devices; and
  updating a status indicator of the unavailable memory.

9. The method of claim 1, wherein the initiating, in accordance with the determined methodology, the rebuilding function comprises at least one of:
 executing the rebuilding function to rebuild the one or more encoded data slices; and
 requesting execution of the rebuilding function to rebuild the one or more encoded data slices.

10. A dispersed storage (DS) unit comprises:
 an interface;
 a memory; and
 a processing module operable to:
  determine whether a memory device of the memory is unavailable to produce an unavailable memory device, wherein the DS unit is one of a plurality of DS units of a dispersed storage network (DSN), wherein a data object is dispersed storage error encoding into a plurality of sets of encoded data slices, and wherein the DS unit stores an encoded data slice from at least some sets of the plurality of sets of encoded data slices to produce stored encoded data slices;
  when the memory device is unavailable and when the memory device is storing one or more of the stored encoded data slices, determine a methodology regarding the one or more encoded data slices based on one or more DSN conditions to produce a determined methodology;
  when the determined methodology includes a rebuilding component, initiate, in accordance with the determined methodology, a rebuilding function to rebuild the one or more encoded data slices to produce rebuilt one or more encoded data slices, wherein the rebuilding function includes obtaining a decode threshold number of encoded data slices for the at least some sets of the plurality of sets of encoded data slices from other DS units of the plurality of DS units; and
  store the rebuilt one or more encoded data slices within available memory of the memory.

11. The DS unit of claim 10, wherein the one or more DSN conditions comprises at least one of:
 decode threshold and pillar width ratio;
 number of DS units in vault that are unavailable;
 network traffic; and
 priority level of the DS encoded data.

12. The DS unit of claim 10, wherein the processing module further functions to:
 when the determined methodology includes waiting for the memory device to become available, wait for the memory device to become available; and
 when the memory device becomes available, change status of the memory device from unavailable to available.

13. The DS unit of claim 10, when the determined methodology includes the rebuilding component, the processing module further functions to:
 establish a time period based on the one or more DSN conditions; and
 when the time period expires, reassign a slice name range associated with the unavailable memory device to the available memory of the memory prior to the storing the rebuilt one or more encoded data slices.

14. The DS unit of claim 13, wherein the processing module further functions to:

when the time period expires, initiate the rebuilding function.

15. The DS unit of claim 10, when the determined methodology includes the rebuilding component, the processing module further functions to:
determine that the memory includes a hot-standby memory device;
when the memory includes the hot-standby memory device, determine, in accordance with the determined methodology, whether to use the hot-standby memory device, wherein the available memory of the memory includes the hot-standby memory device; and
when the hot-standby memory device is to be used, reassign a slice name range associated with the unavailable memory device to the hot-standby memory device prior to the storing the rebuilt one or more encoded data slices.

16. The DS unit of claim 10, wherein the processing module further functions to:
determine whether to transfer the rebuilt one or more encoded data slices from the available memory of the memory to an additional memory of the memory;
when the rebuilt one or more encoded data slices is to be transferred from the available memory of the memory to the additional memory, reassign a slice name range associated with the available memory of the memory to the additional memory; and
transferring the rebuilt one or more encoded data slices from the available memory of the memory to the additional memory.

17. The DS unit of claim 10, wherein the processing module further functions to store the rebuilt DS encoded data by:
reassigning a slice name range of the unavailable memory device to the available memory of the memory, wherein the reassigning the slice name range includes at least one of:
updating the slice name range in a memory device table from the unavailable memory device to the available memory of the memory;
when the available memory of the memory includes a plurality of memory devices:
partitioning the slice name range into a plurality of slice name range partitions; and
assigning one of the plurality of slice name range partitions to one of the plurality of memory devices; and
updating a status indicator of the unavailable memory.

18. The DS unit of claim 10, wherein processing module further functions to initiate, in accordance with the determined methodology, the rebuilding function by at least one of:
executing the rebuilding function to rebuild the one or more encoded data slices; and
requesting, via the interface, execution of the rebuilding function to rebuild the one or more encoded data slices.

* * * * *